United States Patent
Wang

(10) Patent No.: US 9,299,039 B1
(45) Date of Patent: Mar. 29, 2016

(54) MANAGING TASK LISTS UTILIZING INTEGRATED INFORMATION REQUESTS

(75) Inventor: Jiong Wang, Union City, CA (US)

(73) Assignee: A9.com, Inc., Palo Alto, CA (US)

( * ) Notice: Subject to any disclaimer, the term of this patent is extended or adjusted under 35 U.S.C. 154(b) by 1932 days.

(21) Appl. No.: 11/509,434

(22) Filed: Aug. 23, 2006

(51) Int. Cl.
*G06F 9/44* (2006.01)
*G06Q 10/06* (2012.01)

(52) U.S. Cl.
CPC ........ *G06Q 10/06* (2013.01); *G06Q 10/063116* (2013.01); *G06Q 10/0633* (2013.01)

(58) Field of Classification Search
None
See application file for complete search history.

(56) References Cited

U.S. PATENT DOCUMENTS

| | | | | |
|---|---|---|---|---|
| 4,926,343 A * | 5/1990 | Tsuruta et al. | .................. | 706/45 |
| 5,103,498 A * | 4/1992 | Lanier et al. | .................... | 706/58 |
| 5,182,705 A * | 1/1993 | Barr et al. | ....................... | 705/11 |
| 5,282,265 A * | 1/1994 | Rohra Suda et al. | ........... | 706/11 |
| 5,369,575 A * | 11/1994 | Lamberti et al. | ................. | 704/9 |
| 5,625,814 A * | 4/1997 | Luciw | ........................... | 707/763 |
| 5,864,848 A * | 1/1999 | Horvitz et al. | | |
| 5,873,064 A * | 2/1999 | De Armas et al. | ........... | 704/275 |
| 5,892,900 A * | 4/1999 | Ginter | .................... | G06F 21/10 726/26 |
| 5,899,979 A * | 5/1999 | Miller et al. | ....................... | 705/9 |
| 5,978,785 A * | 11/1999 | Johnson et al. | ................. | 706/54 |
| 5,983,200 A * | 11/1999 | Slotznick | ........................ | 705/26 |
| 6,047,260 A * | 4/2000 | Levinson | ..................... | 705/7.15 |
| 6,092,048 A * | 7/2000 | Nakaoka | .......................... | 705/9 |
| 6,108,640 A * | 8/2000 | Slotznick | ..................... | 705/7.18 |
| 6,167,395 A * | 12/2000 | Beck et al. | | |
| 6,170,011 B1 * | 1/2001 | Macleod Beck et al. | ...... | 709/224 |
| 6,216,110 B1 * | 4/2001 | Silverberg | ........................ | 705/9 |
| 6,263,358 B1 * | 7/2001 | Lee et al. | ....................... | 718/100 |
| 6,415,304 B1 * | 7/2002 | Horvitz | ......................... | 715/205 |
| 6,453,465 B1 * | 9/2002 | Klein | ............................ | 717/141 |
| 6,553,310 B1 * | 4/2003 | Lopke | ........................... | 701/213 |
| 6,553,358 B1 * | 4/2003 | Horvitz | ............................ | 706/45 |
| 6,618,716 B1 * | 9/2003 | Horvitz | ............................ | 706/55 |
| 6,678,613 B2 * | 1/2004 | Andrews et al. | .............. | 701/213 |
| 6,859,771 B2 * | 2/2005 | Xun et al. | ......................... | 704/1 |
| 6,938,048 B1 * | 8/2005 | Jilk et al. | | |
| 6,958,692 B1 * | 10/2005 | Ratschunas | .............. | 340/539.13 |
| 6,988,128 B1 * | 1/2006 | Alexander et al. | ............ | 709/206 |
| 7,221,937 B2 * | 5/2007 | Lau et al. | ....................... | 455/419 |
| 7,318,040 B2 * | 1/2008 | Doss et al. | ........................ | 705/9 |
| 7,421,645 B2 * | 9/2008 | Reynar | .......................... | 715/206 |
| 8,086,614 B2 * | 12/2011 | Novy | .............................. | 707/752 |
| 2002/0007309 A1 * | 1/2002 | Reynar | ............................ | 705/14 |
| 2002/0016729 A1 * | 2/2002 | Breitenbach et al. | ............ | 705/9 |
| 2002/0035581 A1 * | 3/2002 | Reynar et al. | ................. | 707/513 |
| 2002/0048369 A1 * | 4/2002 | Ginter | ..................... | G06F 21/10 380/277 |

(Continued)

OTHER PUBLICATIONS

Morgan Sandquist et al., "Task Scheduler", Feb. 2001, <https://docs.kde.org/trunk5/en/kdeadmin/kcron/kcron.pdf>, pp. 1-8.*

(Continued)

*Primary Examiner* — Thuy Dao
*Assistant Examiner* — Samuel Hayim

(57) ABSTRACT

A method and system for assisting a user to generate a task list based on a task description is presented. The task description can be provided as user input or detected based on information about the user. The generated task list includes a series of actions (subtasks) which as a whole complete a task specified in the task description and relevant information. During the task list being generated, some actions are automatically executed without user intervention, or remembered for future execution.

44 Claims, 17 Drawing Sheets

(56) References Cited

U.S. PATENT DOCUMENTS

| | | | |
|---|---|---|---|
| 2002/0095462 A1* | 7/2002 | Beck et al. | 709/204 |
| 2002/0116232 A1* | 8/2002 | Rapp et al. | 705/5 |
| 2002/0116530 A1* | 8/2002 | Burgess | 709/246 |
| 2002/0116541 A1* | 8/2002 | Parker et al. | 709/318 |
| 2002/0142792 A1* | 10/2002 | Martinez | 455/550 |
| 2003/0063072 A1* | 4/2003 | Brandenberg et al. | 345/173 |
| 2003/0084096 A1* | 5/2003 | Starbuck et al. | 709/203 |
| 2003/0120737 A1* | 6/2003 | Lytle et al. | 709/206 |
| 2003/0131142 A1* | 7/2003 | Horvitz et al. | 709/313 |
| 2003/0158855 A1* | 8/2003 | Farnham et al. | 707/102 |
| 2003/0172368 A1* | 9/2003 | Alumbaugh et al. | 717/106 |
| 2003/0191719 A1* | 10/2003 | Ginter | H04N 21/8358 705/54 |
| 2003/0225732 A1* | 12/2003 | Chan et al. | 707/1 |
| 2004/0001099 A1* | 1/2004 | Reynar et al. | 345/776 |
| 2004/0059622 A1* | 3/2004 | Mueller | 705/9 |
| 2004/0064585 A1* | 4/2004 | Doss et al. | 709/246 |
| 2004/0117046 A1* | 6/2004 | Colle et al. | 700/99 |
| 2004/0130572 A1* | 7/2004 | Bala | 345/762 |
| 2004/0133889 A1* | 7/2004 | Colle et al. | 718/100 |
| 2004/0139426 A1* | 7/2004 | Wu | 717/120 |
| 2004/0230636 A1* | 11/2004 | Masuoka et al. | 708/800 |
| 2004/0260593 A1* | 12/2004 | Abraham-Fuchs | G06Q 10/06316 705/7.26 |
| 2005/0057357 A1* | 3/2005 | Helal et al. | 340/539.13 |
| 2005/0060693 A1* | 3/2005 | Robison et al. | 717/143 |
| 2006/0074730 A1* | 4/2006 | Shukla et al. | 705/8 |
| 2006/0074735 A1* | 4/2006 | Shukla et al. | 705/8 |
| 2006/0088144 A1* | 4/2006 | Mitchell et al. | 379/88.17 |
| 2006/0143220 A1* | 6/2006 | Spencer, Jr. | 707/102 |
| 2006/0212866 A1* | 9/2006 | McKay | 718/100 |
| 2007/0055766 A1* | 3/2007 | Petropoulakis et al. | 709/224 |
| 2007/0150387 A1* | 6/2007 | Seubert | G06Q 10/10 705/31 |
| 2007/0174390 A1* | 7/2007 | Silvain | G06Q 10/10 709/204 |
| 2008/0120129 A1* | 5/2008 | Seubert | G06Q 10/06 705/35 |
| 2008/0133326 A1* | 6/2008 | Goncalves et al. | 705/10 |
| 2008/0163225 A1* | 7/2008 | Fragala et al. | 718/102 |

OTHER PUBLICATIONS

Alvin Surkan et al., "Coding of Natural Language Task Descriptions Prior to their Classification by Neural Networks", IEEE, 1993, <http://ieeexplore.ieee.org/stamp/stamp.jsp?tp= &arnumber=284244>, pp. 1-6.*

Richard Amori, "A NATU?dL Language Interface for Task-Oriented Activities", ACM, 1990, <http://delivery.acm.org/10.1145/100000/98885/p553-amori.pdf>, pp. 1-10.*

* cited by examiner

MANAGING TASK LISTS UTILIZING INTEGRATED INFORMATION REQUESTS

BACKGROUND

With the increased popularity of the personal computing device, personal information managing software applications such as schedules, calender, and task list software have become increasingly popular. The advantages of personal information managing software applications are numerous. For example, personal information managing software applications help people to remember an imminent task or guide people not to have conflicted schedules at the same time.

Most current personal information managing applications require a user to enter a task or event manually, which can be tedious and time consuming. Thus, users tend to enter high level tasks hoping that the entered task can remind the user to perform other associated tasks. Some of the associated tasks are required to be completed in advance, but they are not entered within personal information managing software applications. For example, to complete a task of traveling to another city, a user may have to purchase an airline ticket before the user can fly to another city, reserve a hotel room, rent a car, etc. While many associated subtasks may be quite evident, the user can easily miss an opportunity to perform other associated tasks, which typically affects the main task to be done. Even if the user is willing to manually enter every task that the user can imagine, completion of each of subtask (and accordingly the higher level task) can be delayed as users require additional information to complete the subtask. For example, to reserve an airline flight and hotel, the user may require frequent flier identifiers, hotel preferences, and other information. Depending on the associated task/subtask, the user may have to locate necessary information from a variety of internal and/or external sources.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect of the present invention, a system for managing a task is provided. The system comprises at least one database for storing information relating to a user profile and to predefined words, and task management services in communication with the at least one database. The task management services are configured to parse a task input by the user, to identify an action word and corresponding modifiers that support the action word. The task management services are further configured to determine a subtask, based on the identified action word and corresponding modifiers, and execute the subtask. Additionally, the subtask is stored as part of the task list if the subtask cannot be immediately executed.

In another aspect of the present invention, the task management services may search an online database over a network connection or a local database to enable the user to complete the task. The task management services may further obtain information from a map service server over a network connection or may purchase an item via a network-based service provider. Based on the time/date information, the task management services may be configured to alert the user about an action to be executed.

According to another aspect of the present invention, a user interface for enabling a user to complete a task is provided. The user interface comprises a subtask component to determine at least one subtask by parsing action words and modifiers that are described in the task, a relevant information component to obtain information relating to a subtask, and a result information component to display a result, which is produced by an execution of the subtask with the relevant information.

Finally, according to other aspects of the invention, a computer-implemented method and a computer accessible medium for assisting a user to plan a task, or scheduling tasks based on user input, are also provided.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
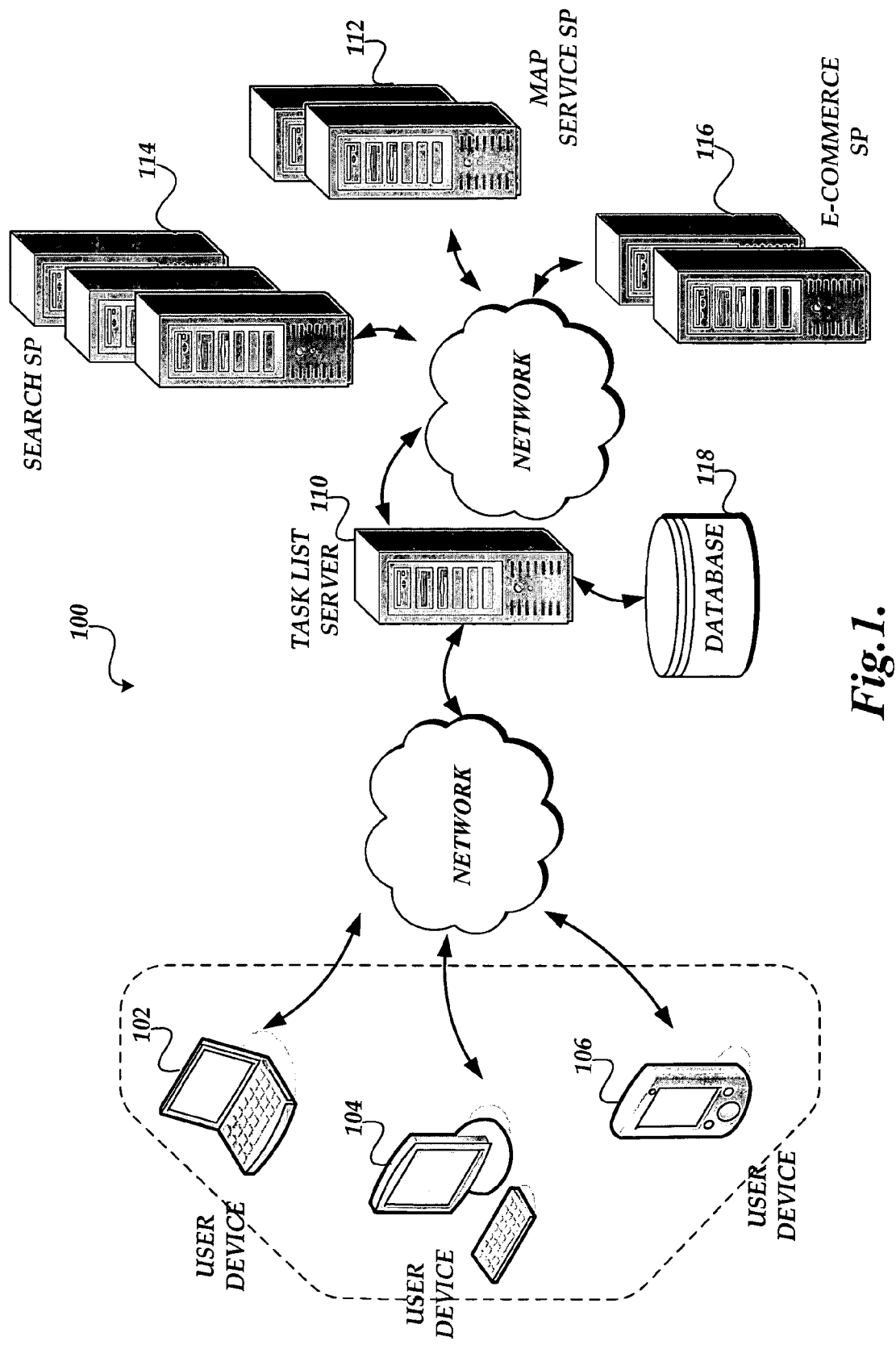
FIG. 1 is a pictorial diagram illustrating an exemplary networked environment suitable for assisting a user to build a task list and to perform tasks specified in the task list, in accordance with an aspect of the present invention.

Generally described, the present invention relates to a method and system for managing task lists. More specifically, the present invention relates to a method and system for assisting a user to build a "task list" and for associating information with specified tasks. Additionally, the present invention can relate to the utilization of customization focused on previous usage. "Task list," as used herein, can correspond to series of actions which a user or a group of users has indicated should be completed. The task description can be either provided as user input or detected based on information about the user. The actions included in the task list may be chosen from predetermined actions based on general human behaviors. Thus, in order to generate the task list, predetermined actions are initially determined based on the task description. One or more actions from the predetermined actions can be updated. Further, a new action can be generated and added to complete the task list.

For example, a user wants to remember to buy a gift before the upcoming Mom's birthday. General human behaviors (series of actions) corresponding to buying a gift may be predefined in the system. As the user inputs a task description such as "buy a gift for Mom," the predefined series of actions including 1) find what Mom wants, 2) find a store to buy the gift, 3) buy the gift, 4) buy a card, 5) buy gift wrap, among other actions, may be identified. A task list for "buy a gift for Mom" may be initially generated including these predefined actions. The user knows that Mom keeps her wish list with her favorite online store. The user can add more actions or sub-actions such as 1) find Mom's favorite store, 2) get a wish list from the store, 3) ask other people about their gifts, 4) determine a gift from the wish list, 5) find a store where the lowest price for the gift is available, etc., to the initial task list. While the task list is being built, some actions, such as "get a wish list from the store," "find a store where the lowest price for the gift is available," etc., are automatically executed with no or little user interaction. Some actions may be executed in a certain order. Other actions may be stored for a future execution.

In an illustrative embodiment, each task can be associated with a separated action/activity that should be completed. Alternatively, one or more tasks can be grouped (such as in a hierarchical arrangement) to correspond to an identified action/activity to be completed.

The following detailed description describes exemplary embodiments of the invention. Although specific system configurations, screen displays, and flow diagrams are illustrated, it should be understood that the examples provided are not exhaustive and do not limit the present invention to the precise forms and embodiments disclosed. It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. However, it will be apparent to one skilled in the art that the invention may be practiced without some or all of these specific details. In other instances, well-known process steps have not been described in detail in order not to unnecessarily obscure the invention.

With regard to the operating environment for the present invention, while there are numerous environments in which a task list may be generated, FIG. 1 illustrates an exemplary networked environment 100 suitable for providing a generated task list to the user device and for executing actions specified by the task list. The exemplary networked environment 100 includes one or more user devices, such as user devices 102-106, by which a user (not shown) can enter or manage task descriptions. The user devices communicate with a Task List server 110 which is configured to generate a task list for the entered task description and perform some actions specified by the task list.

User devices, such as user devices 102-106, are typically computing devices, including a variety of configurations or forms such as, but not limited to, laptop or tablet computers, personal computers, personal digital assistants (PDAs), hybrid PDA/mobile phones, mobile phones, workstations, and the like. While illustrative embodiments have been illustrated and described, it will be appreciated that various changes can be made therein without departing from the spirit and scope of the invention. In one embodiment, the user devices 102-106 can be also connected to a Task List server 110 via a communication network, such as a Local Area Network (LAN) or a Wide Area Network (WAN). In an alternative embodiment, any user device 102-106 can be a standalone user device which is configured to implement offline services. The standalone user device can support a task list management without maintaining a network connection to the Task List server 110. For example, applications and information necessary to manage a task list may readily reside on a certain user device so that the user device can be a standalone device supporting offline services. As illustrated in FIG. 1, the Task List server 110 may be connected to one or multiple service providers, service servers, or online databases 118 over a communication network, such as an internal network or public network connection. For example, as shown in FIG. 1, the Task List server 110 is connected to one or multiple service providers including a search service provider 114, a map service provider 112, e-commerce service provider 116, and the like. The interaction between the Task List server 110 and the service providers will be described in detail below.

Those skilled in the art will appreciate that the various servers/components depicted in FIG. 1 are illustrative only. As mentioned above, an actual embodiment of a Task List server 110 may be comprised of a single computer or a plurality of discrete, cooperative servers distributed in a communications network. Similarly, the identified components should be viewed as logical components, as each component may be physically embodied on one or more computer systems, as well as combined with other hardware and/or software components not illustrated herein.

Figure 2:
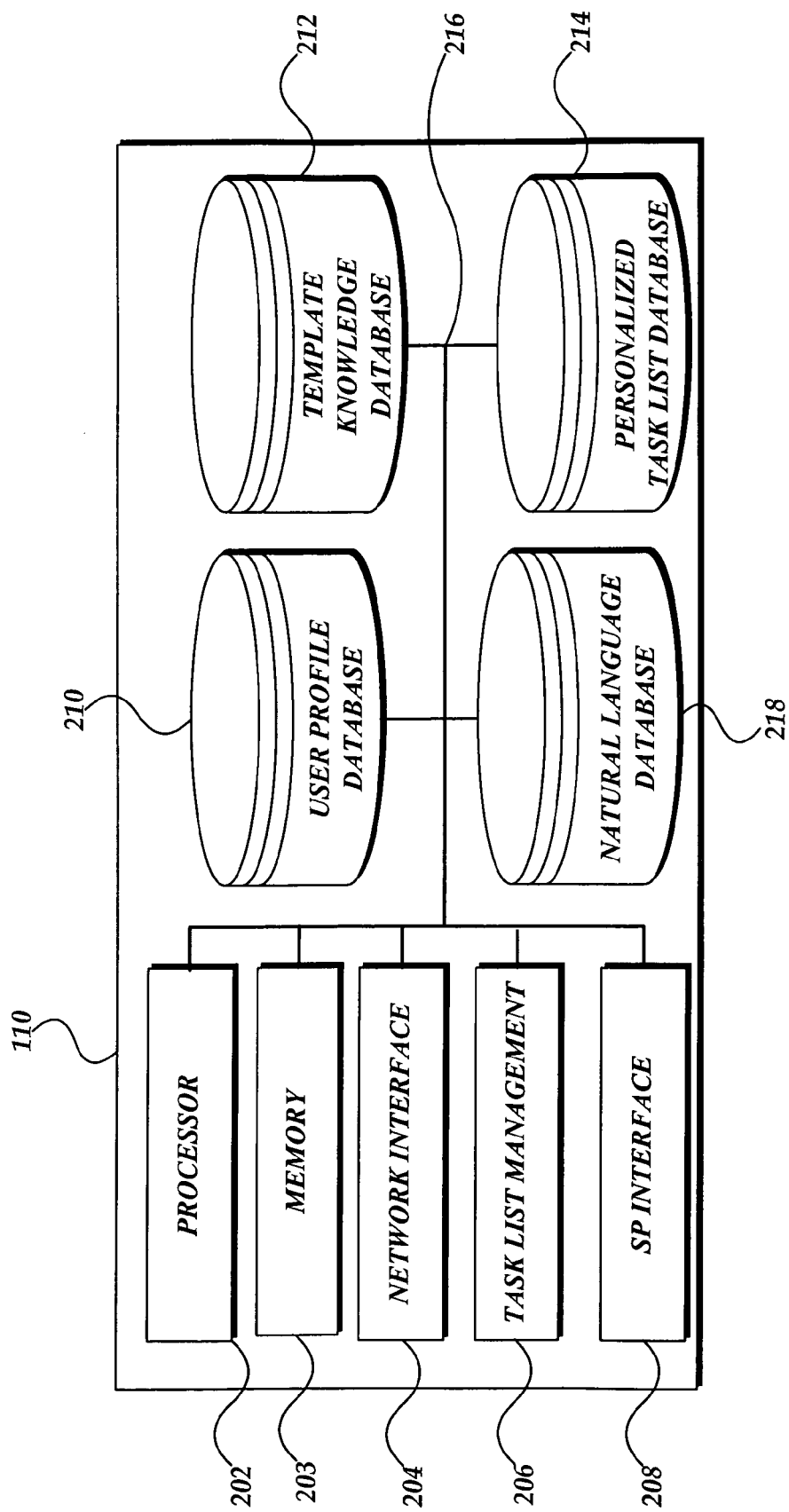
FIG. 2 is a block diagram illustrating exemplary components of an illustrative task list service provider suitable for generating and performing the task list within the networked environment depicted in FIG. 1.

With regard to the Task List server 110, FIG. 2 is a block diagram illustrating exemplary components of the Task List server 110 that are suitable for generating and managing task lists and for executing actions specified by a task list. The exemplary server components also include, but are not limited to, a network interface 204, a processor 202, a task list management component 206, and a service provider (SP) interface component 208.

The processor 202 is configured to operate in accordance with programming instructions stored in a memory 203, which is generally comprised of RAM, ROM, and/or other permanent memory. The memory 203 will typically store an operating system for the Task List server 110 upon which, and with which, most other programs/applications operate. Additionally, the memory 203 will include one or more programs or applications that constitute a virtual storefront, including functions (not shown) such as a front-end handling routine for processing requests from user devices, transaction processing modules, and the like.

The task list management component 206 identifies a series of actions corresponding to the task description and collects relevant information for each action. The task list management component 206 builds a task list for the task so that the user can successfully complete the task with the help of the Task List server 110. While shown as a component within the Task List server 110, the task list management component 206 may alternatively be implemented as an application that is stored within the memory 203 and executed in conjunction with building a task list, a logical component of the Task List server 110, or as a separate server within the networked environment.

With an illustrative embodiment, the service provider (SP) interface component 208 communicates with service providers over a network in order to perform one or more activities required in execution of the task list. In one aspect, the service provider (SP) interface component 208 can contact a map service provider 112 to obtain direction information about a destination where the user is to drive. In another aspect, the SP interface component 208 can contact a search service provider 114 to search information related to performing the activities in execution of the task list. In a further aspect, e-commerce service provider 116 can be contacted for conducting purchase transactions associated with the activities in execution of the task list. In a still further aspect, the SP interface component 208 can contact a user device to obtain information stored in a local database of the user device.

The exemplary server components of the Task List server 110 also includes various databases comprising a user profile database 210, a template knowledge database 212, a natural language database 218, and a personalized task list database 214. Although the databases 210, 212, 218, 214 are depicted to be local databases to the Task List server 110 in FIG. 2, these databases 210, 212, 218, 214 can be aggregated databases including remote, online, or distributed databases accessible over the network. The user profile database 210 can includes the user profile information, the user-supplied preference information, which also includes additional information related to the identified user. Other information may be stored in the user profile database 210, including, but not limited to, user account information, wish lists, billing addresses, all or some of which may be used by the SP interface component 208 to conduct purchase transactions with the e-commerce service provider 116. As described above, the user profile database 210 may be an aggregated database including distributed user profile databases accessible over the network.

In an illustrative embodiment, the personalized task list database 214 may include task lists, conditions to execute a certain action specified in the task list, a result of execution of an action specified in the task list, and any information associated with a task list for each user. In an aspect, while the Task List server 100 is building a task list, the information stored in the personalized task list database 214 may be utilized for avoiding conflicts, detecting sociable events, and the like. For example, available time/date information for a meeting can be determined by examining the personalized task list database 214. The determined available time/date information may be presented to a user. In a further aspect, the personalized task list database 214 can also be stored in a user device for offline access of the task lists.

The natural language database 218 may include natural language information to assist the task list management component 206 to recognize an action word and modifiers from a task description. For example, action words commonly used in everyday life may be predefined in the natural language database 218. Additionally, a relationship between a group of action words and a predefined action word may be defined in the natural language database 218.

The template knowledge database 212 may store predefined templates which associate with a human action, and information relevant to the human action. A template may consist of a series of actions, an order of the series of actions, preconditions of each action, information required to perform each action, and the like. A template can also include an action (subtask) that can be performed by another series of actions.

As will be described in greater detail below, the information stored in the natural language database 218 and the template knowledge database 212 may be utilized by the task list management component 206 to generate a task list with respect to a task description. In one embodiment, the task list management component 206 identifies predefined action words and modifiers which have associated with information stored in the natural language database 218. Based on the identified action words and modifiers, the task list management component 206 determines a corresponding template from the template knowledge database 212. The task list management component 206 may use the determined template to generate an initial task list for the user. In some instance, the initial task list may include subtasks which are also defined in other templates (sub-templates) which consist of other actions to complete the subtasks. The task list management component 206 may determine additional actions by utilizing the sub-templates corresponding to the subtask and add the determined additional actions to the task list. The sub-templates can be found from the template knowledge database 212, provided from a third party service provider, created by the user, or the like.

Figure 3:
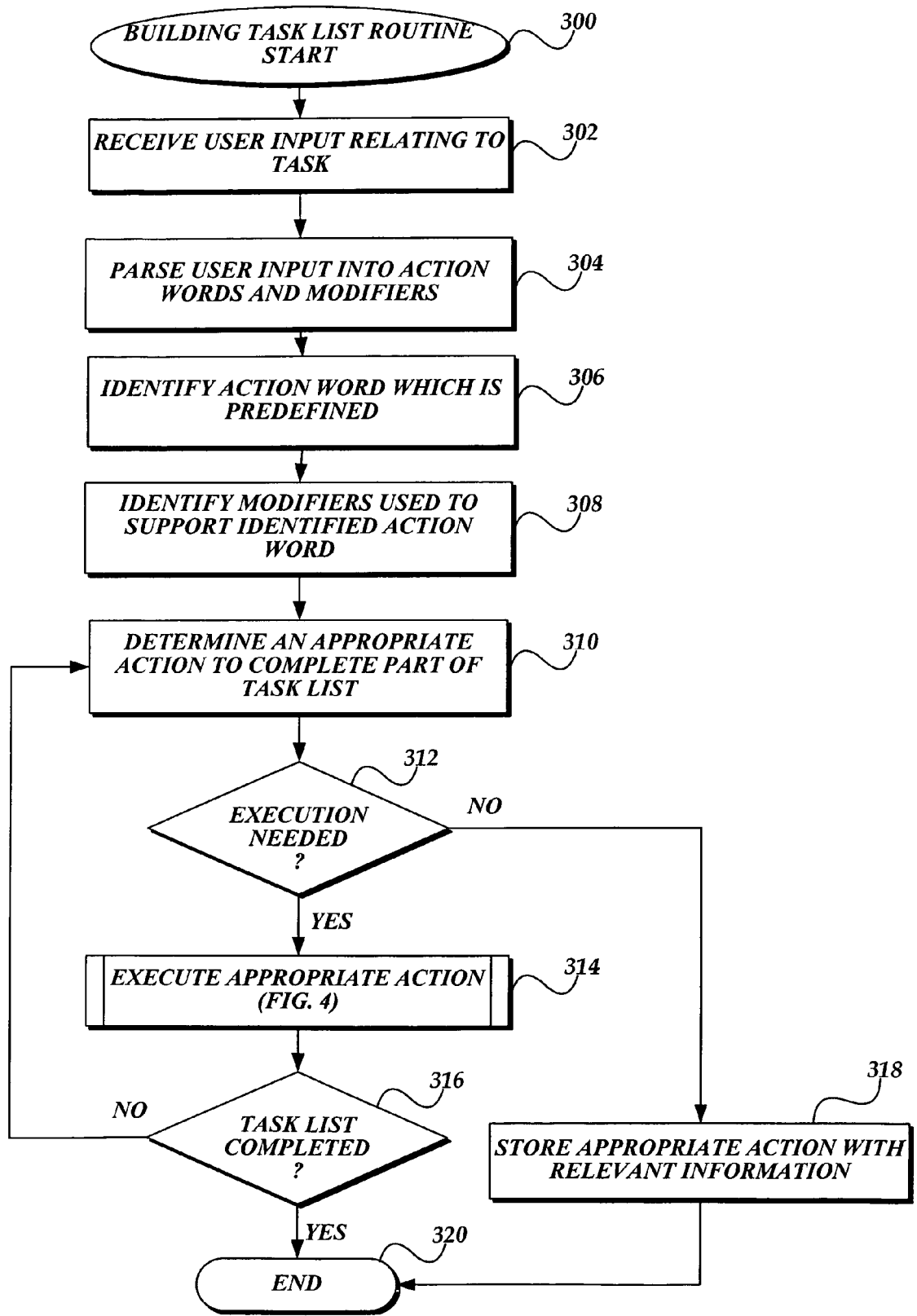
FIG. 3 is a flow diagram of an exemplary routine for building a task list in response to user input and for completing the task list, in accordance with an aspect of the present invention.

Referring to FIG. 3, a flow diagram of an exemplary routine for building a task list in response to user input and for performing the task list in accordance with an aspect of the present invention is shown. Beginning at block 302, the Task List server 110 receives user input relating to a task (e.g., a task description) from a user. Although the embodiments described in conjunction with FIG. 3 utilize text as user input, the user input can be received in any input type such as an e-mail, a fax, voice, text, etc. Further, regardless of the type of the user input, the Task List server 110 is configured to parse the user input into words.

As described above, in order to easily recognize an action word from the task description, action words commonly used in everyday life may be predefined in the natural language database 218. The predefined action words may corresponds to a template stored in the template knowledge database 212. In one embodiment, each predefined action word may be corresponding to a human action-flow which may naturally occur. The Task List server 110 may work through a human action-flow in accordance with relevant information, parsed modifiers, etc. As a result of the human action-flow processing, a series of actions may be identified and included in a task list. In another embodiment, a relationship of a human action-flow and its corresponding template(s) may be defined in the template knowledge database 212. In this embodiment, template(s) corresponding to the identified human action-flow may be utilized when the Task List server 110 generates a task list. It is to be noted that the use of a template or a human action-flow is for an exemplary purpose only. Any suitable data structure and logic which can represent a predefined list of actions corresponding to a task description can be used in conjunction with embodiments of the present invention.

At block 304, the task description is parsed into action words and modifiers. Generally described, the action words are verbs in the task description and the modifiers may be words which provide information supporting the action words. At block 306, the Task List server 110 identifies a predefined action word which corresponds to at least one word representative to the parsed action words. In some cases, the predefined action word and the parsed action word are the same word. In some cases, the predefined action word has a similar meaning of the parsed action word but is a different word. For example, a predefined action word "BUY" is identified for parsed action words "PURCHASE," "ACQUIRE," etc. At block 308, the modifiers used to support the identified action word may be identified. For the purpose of discussion, assume that the user enters "Go to a Dentist" for a task description. The task description "Go to a Dentist" is parsed into "GO" and "DENTIST" and "DENTIST" is identified as a modifier supporting the "GO" action word.

At block 310, an appropriate action suitable for completing all or part of the task description is determined. The appropriate action can be determined from a task list which is built by the Task List server 110 based on a template which is identified from the template knowledge database 212. As will be described in greater detail below, while building a task list, the Task List server 110 may identify, among other things, who, when, and where information relating to the action word (e.g., what information), after recognizing an action word and modifiers. In some cases, a task description itself may provide all the necessary information. If the information is not readily available from a task description entered by the user, the Task List server 110 may generate queries to obtain the unavailable information. Additionally, a user may be able to edit or customize the response. The Task List server 110 may include the necessary information to execute actions as part of the task list.

In the above example, a template including a series of actions relating to "GO" and "DENTIST" are determined via the template knowledge database 212 and the natural language database 218. The Task List server 110 may use the series of actions to generate an initial task list for the user. As will be described in a greater detail below in FIGS. 3A-3E, the initial task list may include, but is not limited to, a series of actions such as 1) "GET TELEPHONE NUMBER," 2) "MAKE a CALL," 3) "MAKE an APPOINTMENT," 4) "SAVE DATE/TIME INFORMATION," 5) "SET UP REMINDER," 6) "GET a DIRECTION," etc.

At decision block 312, a determination is made as to whether the appropriate action is an executable action or a do-to action. This determination may be based on a variety of aspects as described above including, but not limited to, preconditions of the action, proceeding actions, user-defined preference, and the like. For example, the series of actions to complete the task list for "GO to DENTIST" all can be determined as executable actions. However, the user may specify that the 4) "MAKE a CALL," 5) "MAKE an APPOINTMENT," 6) "SAVE DATE/TIME INFORMATION" actions should be to-do actions due to a possible schedule conflict. In this scenario, the Task List server 110 recognizes those specified actions as to-do actions and the rest as executable actions. If it is determined at decision 312 that the appropriate action is an executable action, at block 314, the Task List server 110 (or the user) executes the appropriate action via an executing action subroutine 400. (See FIG. 4.) The Task List server 110 can play an active role to execute an action. For example, the Task List server 110 automatically sends a flight schedule to a person who is arranged to pick up the user at the airport or enable the user to send the flight schedule before his or her departure. Alternatively, the Task List server 110 executes an action which has been delegated by the user. In addition, the Task List server 110 alerts the user about an action to be executed. Subsequently, upon executing the action, the user may send a proper confirmation to the Task List server 110. For example, the Task List server 110 informs the user that the flight schedule should be provided to a person who is arranged to pick up the user. After the user calls up the person and provides the flight information, the user sends a confirmation of executing the action to the Task List server 110. In this manner, the Task List server 110 can keep track of successfully executed actions, unsuccessfully executed actions, and soon-to-be executed actions.

At decision block 316, a determination is made as to whether a task list, with respect to the task description, is completed. This determination can be made based on remaining actions in the identified template(s) which the Task List server 110 has not worked through. If it is determined that the task list is not completed, the routine will proceed to block 310 and repeats the above mentioned steps until the task list is completed. If it is determined at block 312 that the appropriate action is not to an executable action, the appropriate action with relevant information may be categorized as a to-do action and stored as part of the task list at block 318. After storing the action (block 312) or if it is determined that the task list is complete (decision block 316), the routine completes at block 320.

Figure 4:
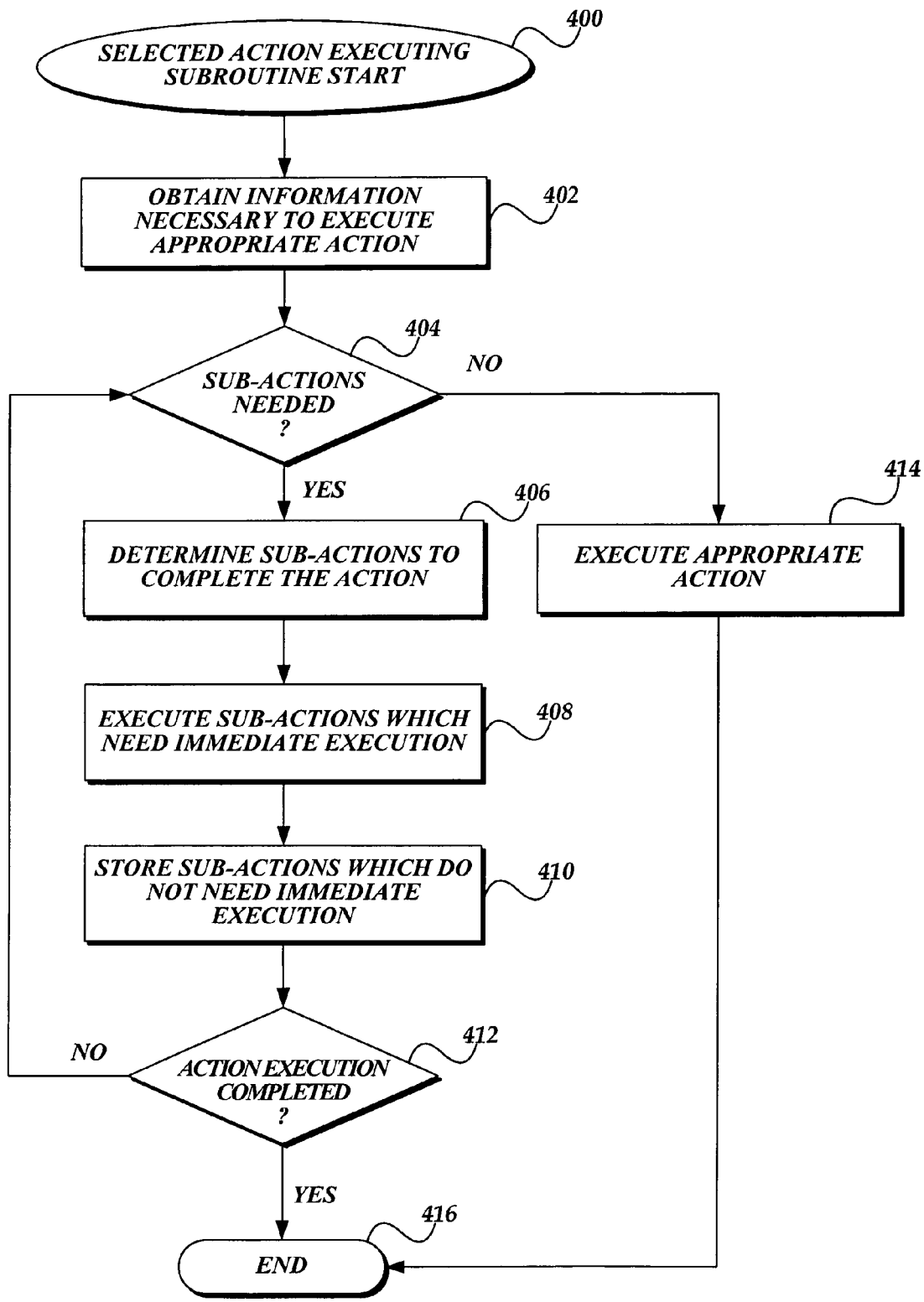
FIG. 4 is a flow diagram of an exemplary subroutine for executing the actions specified by the task list, in accordance with an aspect of the present invention.

FIG. 4 is a flow diagram of an exemplary subroutine for executing an action specified in the task list in accordance with an embodiment of the present invention. At block 402, the information which may be necessary to execute the action is obtained. For the purpose of discussion, returning to "GO to DENTIST" example, with respect to the "GET a TELEPHONE NUMBER" action, the necessary information may include, but is not limited to, a dentist name, address, telephone number and the like. In one embodiment, the Task List server 110 may obtain the necessary information from accessible databases including local database of a user device and its own databases. Moreover, the Task List server 110 may obtain the necessary information from other service providers, an online database server, a call center, an e-commerce service server, and the like. Alternatively, the user can manually enter such information to the Task List server 110. At decision block 404, a determination is made as to whether any sub-actions are needed to execute the action. Some actions may have their corresponding template including a series of sub-actions. For example, the "GET a TELEPHONE NUMBER" action may correspond to a template which can be identified with "GET" action word and "TELEPHONE NUMBER" modifier. If it is determined at decision 404 that sub-actions are needed for the appropriate action, at block 406 the Task List server 110 determines sub-actions to complete the action. When a template has bee identified, the Task List server 110 will work through the sub-actions included in the template. While working though the sub-actions, the Task List server 110 may determine whether each sub-action needs immediate execution or can be immediately executed. At block 408, the Task List server 110 may execute a sub-action which needs immediate execution or which can be immediately executed. After execution of the sub-action, the result of execution along with the sub-action may be stored as part of the appropriate action in the task list. At block 410, the Task List server 110 may store the to-do sub-actions as part of the action. The to-do sub-action may need to be executed at a predetermined time. In one embodiment, a simple flag may be used to indicate the sub-actions needed to be executed at a predetermined time which can be provided from the user or determined by the Task List server 110. At decision block 412, a determination is made as to whether the action execution is completed. The action execution may be regarded to be completed if the Task List server 110 has worked though each sub-action. If it is determined at decision block 412 that the action execution is not complete, the routine 400 proceeds to decision block 404 and repeats the above-mentioned steps.

If it is determined at decision block 404 that no sub-actions are needed for the appropriate action, at block 414, the appropriate action is executed. For example, the "SET UP REMINDER" action may not need any sub-actions. The Task List Server 110 (or the user) may execute the "SET UP REMINDER" action. The result of the execution of the appropriate action, conditions, etc., may be stored as part of the task list. If it is determined at decision block 412 that the action execution is completed or after execution of the appropriate action at block 414, the subroutine completes at block 416.

Although the embodiments described in conjunction with the routine 300 and the subroutine 400 identify and utilize a predefined template stored in the template knowledge database 212, it is contemplated that a new template may be generated in the course of building a task list. The new template will be stored in the template knowledge database 212. For example, when a task description entered by the user is parsed into action words and modifiers which, in conjunction with natural language data, do not result in any matching template, the most closes template may be used as a base template. With user interactions, the Task List server 110 may determine additional actions or unnecessary actions from the base template and generate a task list for the task description accordingly. A new template corresponding to the generated task list may be created and stored in the template knowledge database 212. Initially, the generated task list will be stored in the personalized task list database 214 and/or a local database of the user's devices.

It is further contemplated that the Task List server 110 may detect sociable events from the user profile database 210, the personalized task list database 214, or the like. In some instances, the Task List server 110 may allow a group of users to share all or part of their personalized task lists. The user can be excluded from a certain group by configuring user preference information, or the like. In one embodiment, the sociable events can be detected from shared portions of personalized task list data of other users. Upon detection of sociable events, the Task List server 110 may suggest some proactive tasks to a user or a group of users. In response to such suggestion, the user(s) can accept (or reject) all or some of the suggested tasks. Once the user(s) accepts any suggested tasks, a new task list will be generated and stored in databases. For example, the Task List server 110 may suggest booking a trip for an anniversary a few months before the anniversary date after the Task List server 110 recognizes that the user usually goes on a romantic trip to celebrate anniversaries. For another example, the Task List server 110 may suggest a group of close friends to go to a particular restaurant for a birthday party after the Task List server 110 recognizes that the user will have a birthday party with the group of close friends. Alternatively, a user can suggest a group of close friends to go to a particular restaurant for a birthday party via the Task List server 110. As will be described in greater detail below, each from the group of close friend can accept or reject the suggestion. In one embodiment, the suggested tasks will be stored temporarily in memory of the Task List server 110 and is eventually stored in the personalized task list database 214 and local database of the user's devices upon user's approval of the suggested tasks.

Figure 5A:
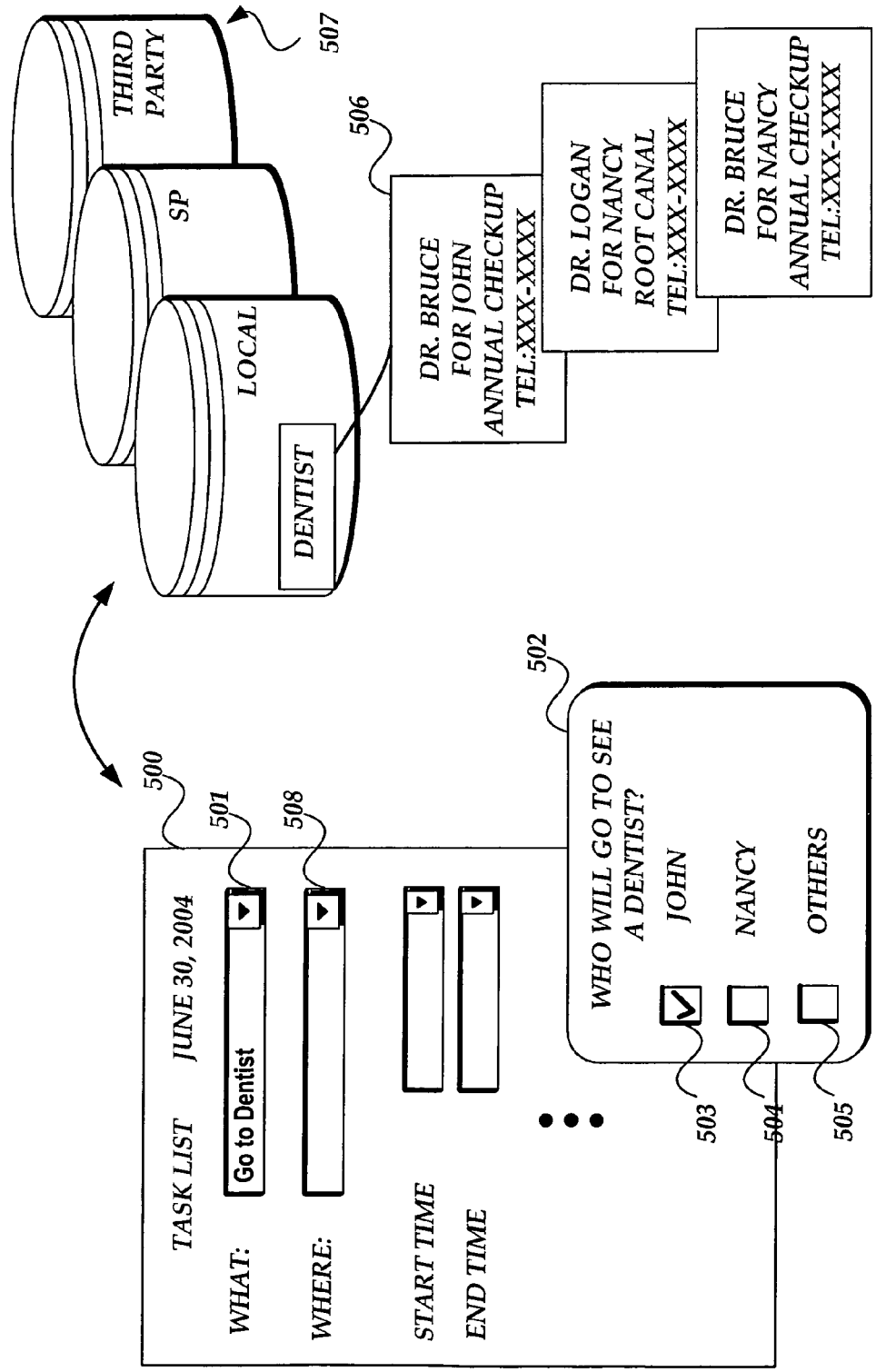
FIGS. 5A-5E are pictorial diagrams of exemplary screen displays for generating a task list based on a first task description in accordance with an aspect of the present invention.

Referring now to FIGS. 5A-5E, pictorial diagrams of exemplary screen displays 500 generated on a user device after a user enters a task description are shown. In particular, FIG. 5A illustrates an exemplary screen display 500 reflecting resultant queries after the Task List server 110 identified action words and modifiers from a task description 501 "GO to DENTIST.". After the action word "GO" and the modifier "DENTIST" are -identified, several queries may be generated to get additional information. For example, "who" will go to see a dentist will be queried. As described above, the task description 501 can be parsed into action words and modifiers. In one embodiment, a user may provide the task description in such a way which allows the Task List server 110 to recognize action words and modifiers without parsing the task description. For example, a user interface may be presented to the user to easily break the task description 501 into a specific format (e.g., an action word, a modifier, etc.) via user interaction. As shown in FIG. 5A, the screen display 500 includes an inquiry window 502 about "who" will go to see a dentist. In this present example, the Task List server 110 retrieves previous dentist appointments from the local database. The Task List Server 110 finds thee previous appointments 506, one was for John and two for Nancy. The inquiry window 502 displays user selections 503, 504, 505. Typically, the Task List server 100 may assume the user who is currently interacting is the person for whom the task description is intended. In this example, the inquiry window 502 can show that the user name is selected by default. Subsequently, the user can reselect one from the user selections 503, 504, 505 or manually enter the information about "who" will go to see a dentist.

Based on the user selection, the Task List Server 110 can determine "who" is going to see a dentist. After obtaining the "who" information, the Task List Server 110 may determine the "where" information. Assume that the user indicates "John" will go to see the dentist by choosing a user selection 503. Based on the user selection, the Task List Server 110 finds a dentist whom John sees regularly based on information available from the appointments 506. The Task List Server 110 may determine Dr. Bruce for the "where" information. In one embodiment, the Task List server can suggest a new dentist for John. For example, the Task List Server may suggest top 5 local dentists from a preferred dentist list provided by the insurance company. For another example, Nancy loved her dentist and she recommended her dentist to her family. In the local database, Nancy's recommendation may have been stored. Based on the recommendation, the Task List server 110 may present Nancy's Dentist as an option. In this embodiment, the input box 508 may display a list of doctors which includes John's dentist, and several dentists suggested by the Task List server 110.

As mentioned above, a list of actions relating to "GO to DENTIST" (main task) are determined via the template knowledge database 212 and the natural language database 218. The Task List server 110 may use the determined template to generate an initial task list for the user.

Figure 5B:
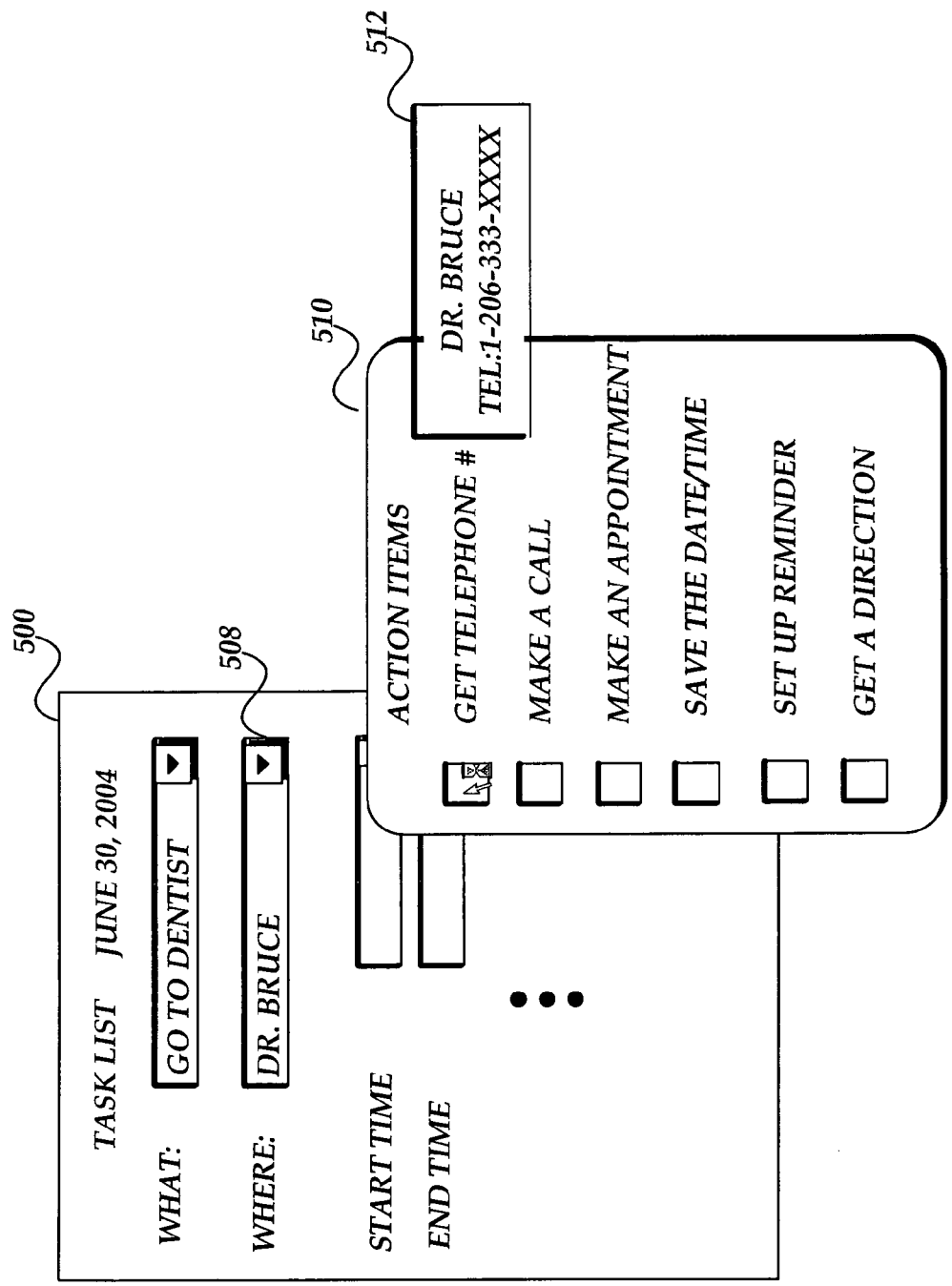

As can be seen in FIG. 5B, an action items window 510 displays a list of actions (subtask) relating to the main task ("GO to DENTIST"). More particularly, the action items window 510 displays a list of actions with a first action being "GET TELEPHONE NUMBER." After Dr. Bruce has selected to fill the "where" information 508, the Task List server 110 provides a phone number which is obtained from the previous appointment 506 with Dr. Bruce. As will be appreciated by one of ordinary skill in the art, the contact information can be obtained from various resources, such as an address book, a preferred dentist list, a yellow page listing, e-mails, etc. The obtained telephone number will be stored as part of the task list generated for the main task.

As described above, the Task List server 110 may include readily available functionality to assist the user to perform some actions defined in the task list. In one embodiment, the Task List server 110 may support a Voice over Internet Protocol (VoIP) communication and allow the user to perform the "MAKE a CALL" action via a VoIP communication. In an alternative embodiment, the Task List server 110 is coupled to a VoIP service provider which allows the user to perform the "MAKE a CALL" action via a VoIP communication.

Figure 5C:
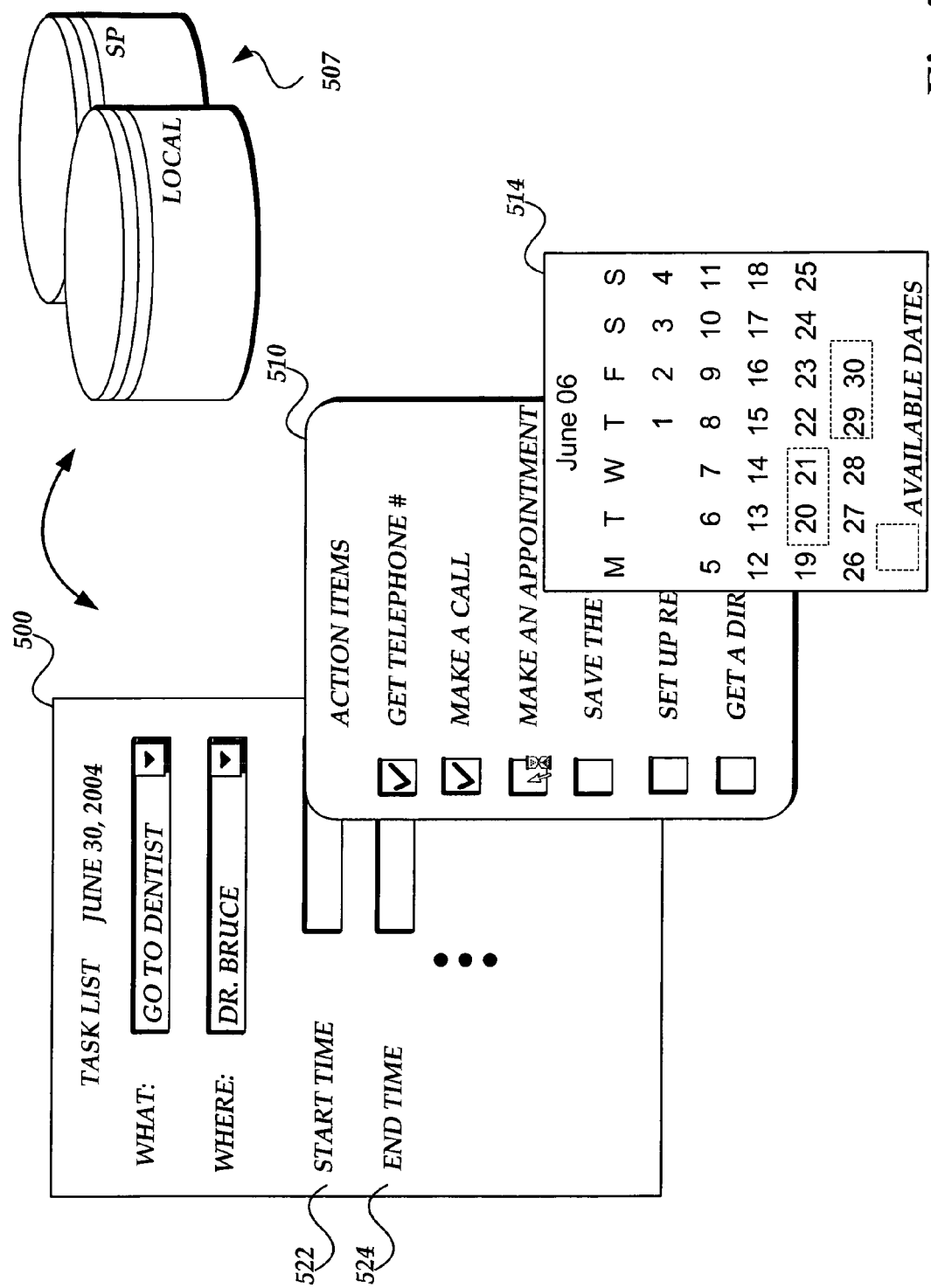
Figure 5D:
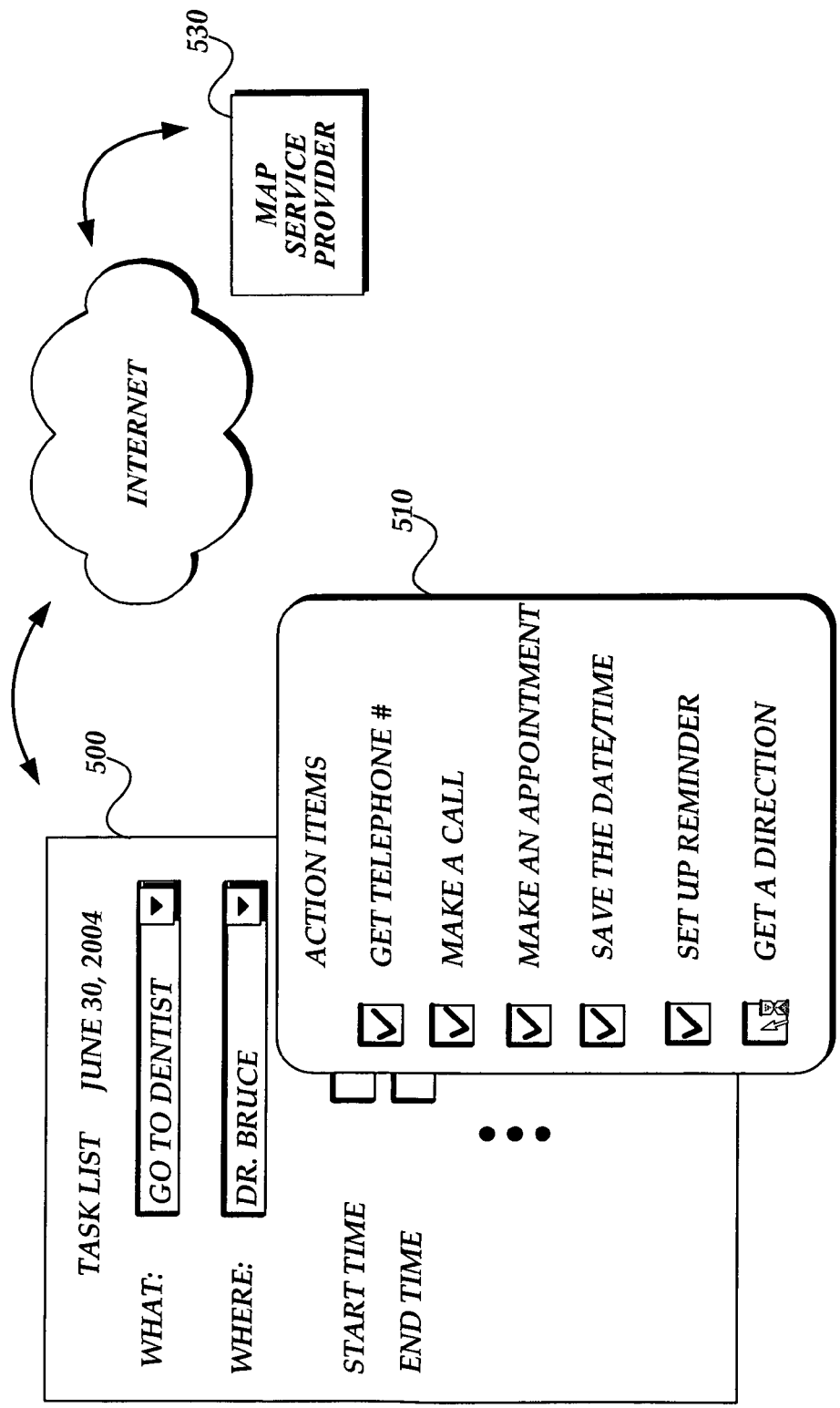

In FIG. 5C, while the user is performing a third action "MAKE an APPOINTMENT" subsequent to the "MAKE a CALL" action as displayed in the action items window 510, an Available Dates window 514 may display available date information to assist the user to perform the third action. For example, the Available Date window 514 displays four possible dates for the dentist appointment, which are June 20, June 21, June 29, and June 30. With this information, the user can set up an appointment without incurring any schedule conflict. In this present example, previously generated task lists which have been stored in the personalized task list may be checked for determining available dates.

After setting up an appointment, the "when" information may be queried. The user may manually enter the date/time information to input boxes 522, 524 provided in the exemplary screen display 500. Alternatively, the Task List server 110 may fill the date/time information into input boxes 522, 524 in the exemplary screen 500. After most action items in the action item window 510 have been performed, the action item window 510 in FIG. 5D may enable the user to perform some optional actions. More particularly, the action item window 510 includes the "GET DIRECTION" action which does not need to be performed if the user already knows how to get to the dentist office. If needed, the "GET DIRECTION" action can be performed either immediately or at any time before the dentist appointment. In this present example, in response to the user's selection indicating to perform the "GET DIRECTION" action, the Task List server 110 communicates with a map service provider 530 over the Internet. Subsequently, the obtained map and direction information may be obtained and stored as part of the "GET DIRECTION" action in the personalized task list database. In an illustrative embodiment, some actions which do not require immediate execution may be batched for delayed execution. For example, the map and direction information may be obtained at night or during weekends. The workload within the Task List server 110 may be more evenly distributed over time.

Figure 5E:
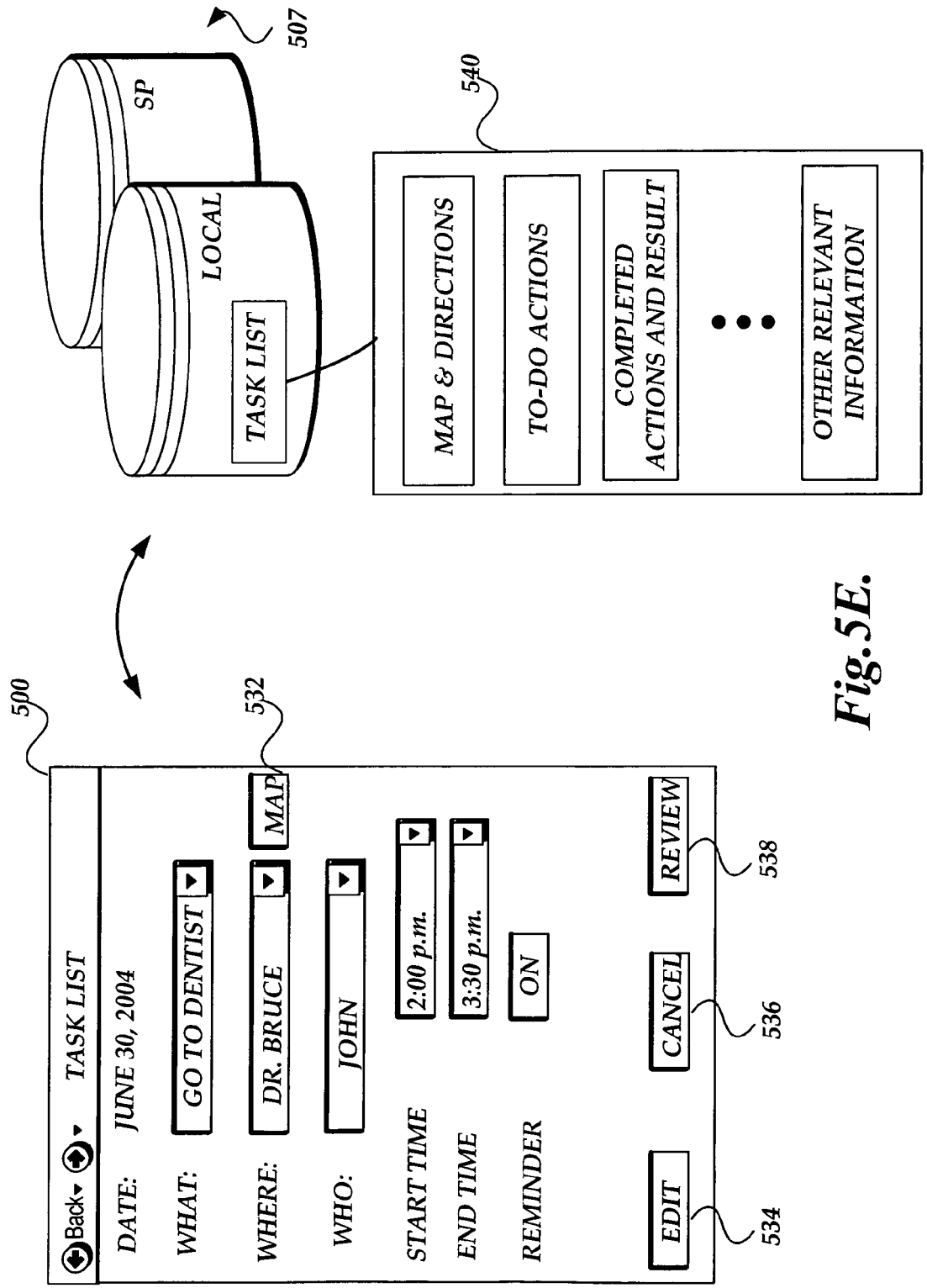

In FIG. 5E, the exemplary screen 500 displays information which corresponds to a resulted task list about "GO to DENTIST" after some actions have been executed. As will be appreciated by one of ordinary skill in the art, the Task List server 110 enables the user to have a reminder associated with the task list on a certain date and time. In addition, the Task List server 110 further enables the user to review detailed information related to the task list. For example, the user selects MAP 532 to access the map and direction information of Dr. Bruce office.

As shown, the local database (or SP's database) may store the resulted task list 540 including information about executed actions and results, actions to be executed at a predetermined time, other relevant information and the like. In one embodiment, the user may be enabled to review, update and remove all or part of the information within the stored task list 540. For example, the user can select EDIT 534 for updating, REVIEW 536 for reviewing (read), and CANCEL 538 for removing all or part of the information included in the stored task list 540.

Figure 6A:
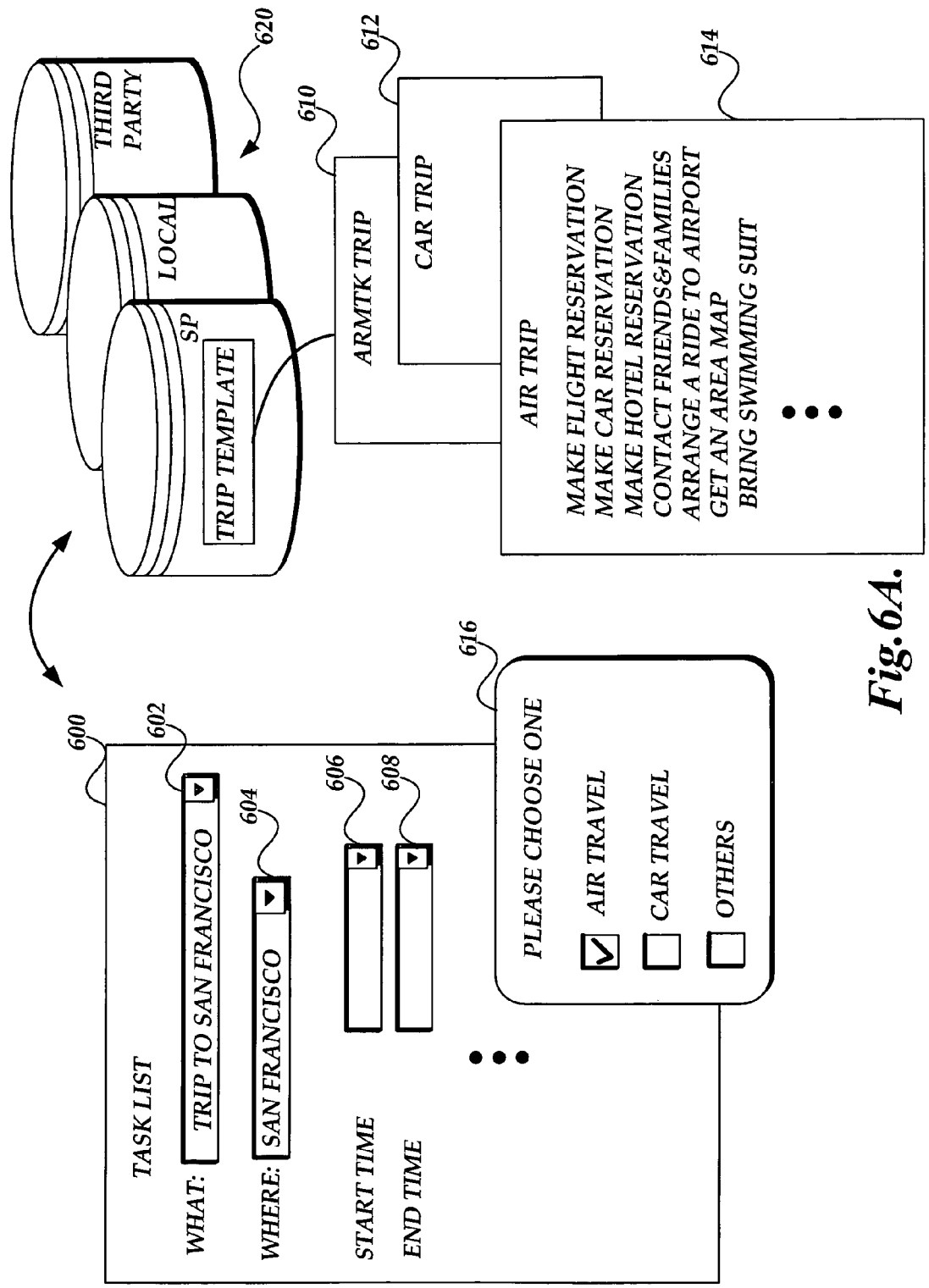
FIGS. 6A-6D are pictorial diagrams of other exemplary screen displays for generating a task list based on a second task description in accordance with an aspect of the present invention.
Figure 6B:
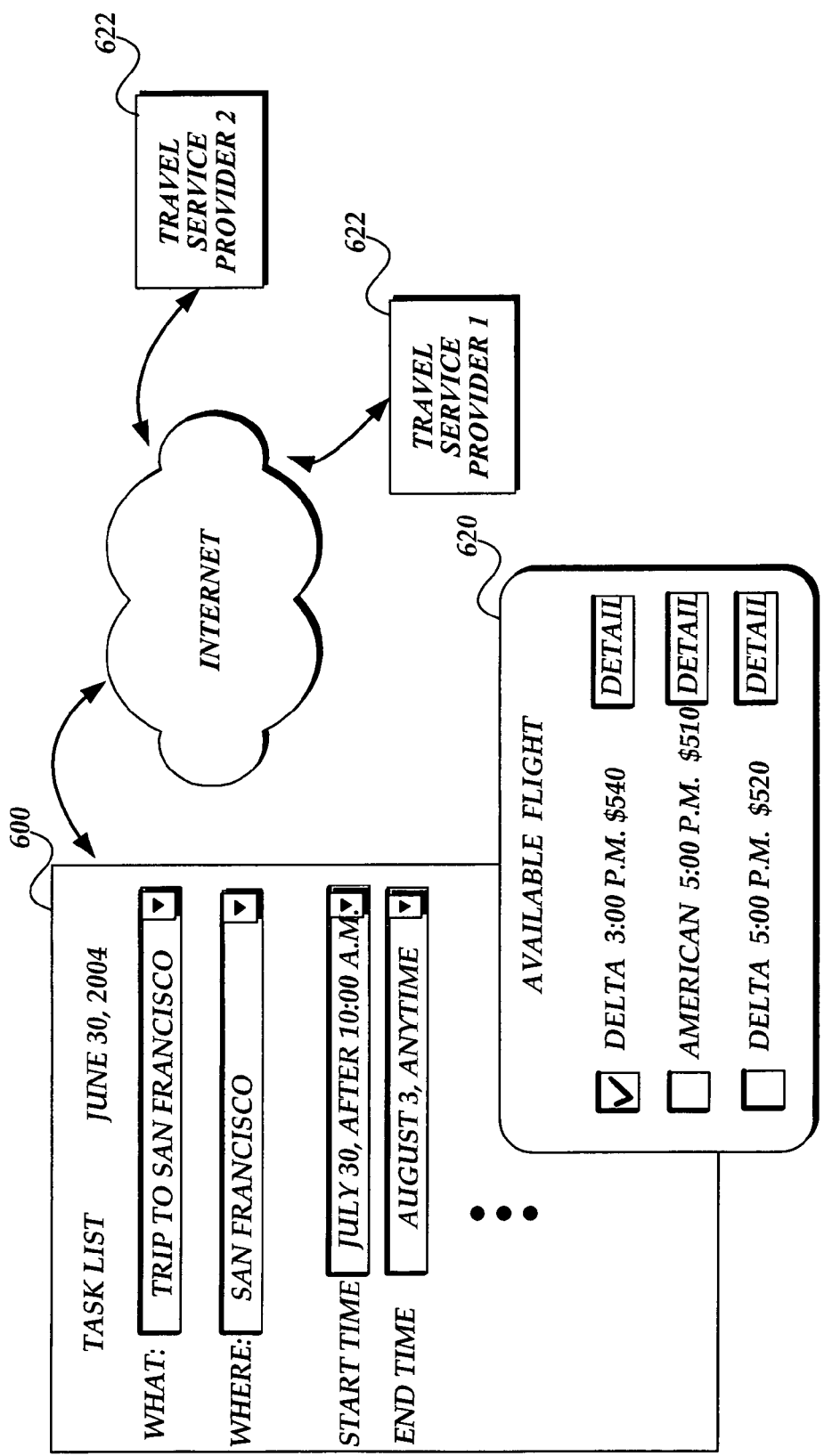

Referring now to FIGS. 6A-6D, pictorial diagrams of another exemplary screen 600 generated on a user device after a user enters a task description are shown. In particular, FIG. 6A illustrates an exemplary screen display 600 reflecting resultant queries after the Task List server 110 parsed a task description 602 "TRIP to SAN FRANCISCO" into action words and modifiers and obtained "who" information. As mentioned above, the user may be assumed to be an actor of the task description by default unless the user indicates otherwise. After parsing, the Task List server 110 may recognize that the task description indicates that the user will "TRIP" to "SAN FRANCISCO." The Task List server 110 accesses the natural language database 218 with the parsed action word and identifies corresponding templates from the template knowledge database 212. More particular, TRIP TEMPLATES 610, 612, 614, which include predefined actions generally necessary for a trip to somewhere, are identified from the template knowledge database. An inquiry window 616 displays user selections such as "AIR TRAVEL," "CAR TRAVEL," and "OTHERS" in order to determine a proper template for the user's "TRIP." Assume that the user indicates "AIR TRAVEL," the Task List server 110 identifies AIR TRIP TEMPLATE 614 to build a task list for "TRIP to SAN FRANCISCO." While the Task List server 110 is working through each action in the template and gather relevant information accordingly, some actions may be performed by the Task List server 110 or the user.

In one embodiment, the Task List server 110 may assist a user to perform a certain action via communications with other servers or service providers. One example may be enabling the user to conduct a purchase transaction with e-commerce service providers. In addition, the user can delegate a purchasing authority to the Task List server 110. The user may have specified conditions of such delegation in the user profile database 210. Under the user specified conditions, the Task List server 110 may conduct an automated purchase transaction with e-commerce service providers without user intervention. Another example may be communicating with a search service provider to search information on behalf of the user. Returning back to the exemplary screen 600, in FIG. 6B, the Task List server 110 communicates with several travel service providers 622 over the Internet and obtains available flights on the date when the user wants to travel, price information, time information, and other detailed information about each available flight. The Task List server 110 may negotiate with the travel service providers 622 with respect to price, assigned seat, connecting flight, etc. In one embodiment, service providers may provide templates suitable to execute a subtask or an action within the service providers. In some instances, the Task List server 110 may identify several templates corresponding to one action. The Task List server 110 may determine an appropriate template on behalf of the user, or display the identified templates for the user to choose one. For example, the travel service providers 622 may provide several "making a flight reservation" templates to the Task List Server. Each template can include different actions or information, for example, obtaining a promotion offer which is available from a specific travel service provider.

After the user indicates to purchase an available flight displayed in an inquiry window 620, the Task List server 110 may further identify subsequent actions related to "PURCHASE" and "TICKET." For example, the subsequent actions may include 1) obtaining credit card information 2) obtaining billing address associated with the credit card 3) provide the obtained information to the travel service providers 4) receive a confirmation of purchasing a ticket, etc. In one embodiment, another template associated with "PURCHASE" and "TICKET" may be identified and used, which may also include the above mentioned actions.

Figure 6C:
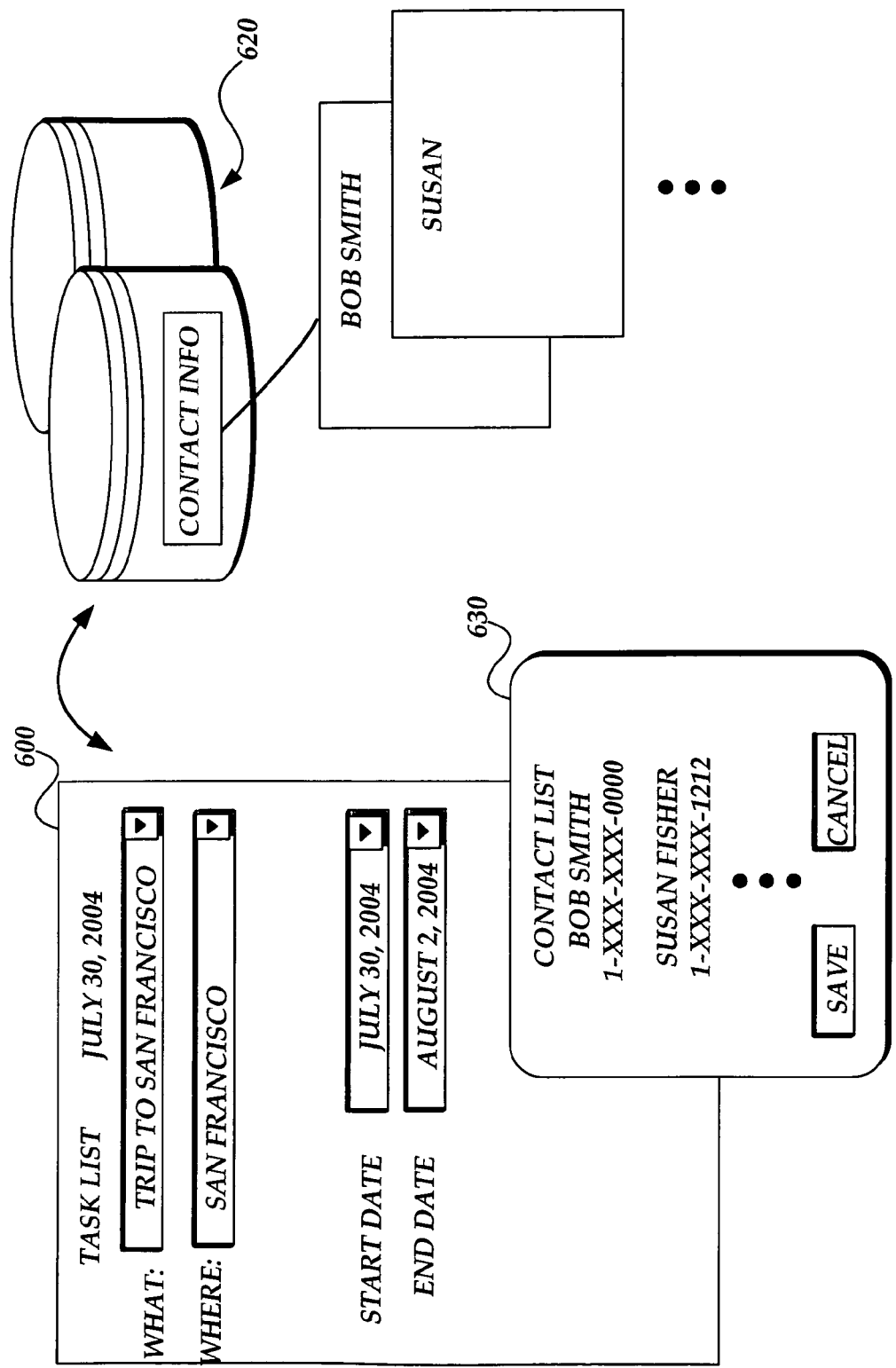
Figure 6D:
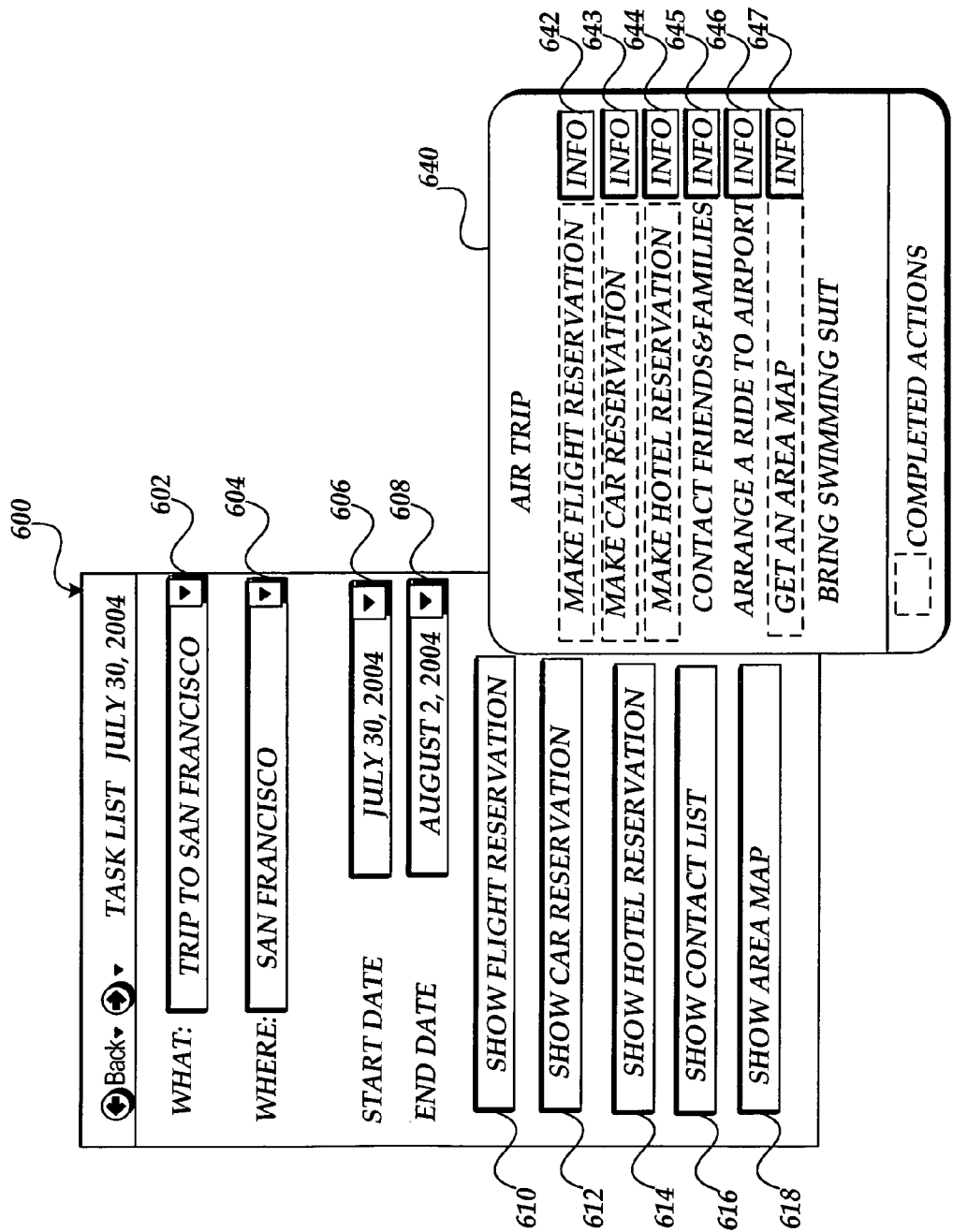

As previously mentioned, the Task List server 110 can assist a user in various ways other than generating a task list. In FIG. 6C, another inquiry window 630 displaying contact information about friends, families, acquaintances who live in San Francisco Area is shown. As shown in FIG. 6D, an exemplary screen 600 displays a generated task list for "TRIP to SAN FRANCISCO" within an action item window 640. The action item window 640 may distinguish actions which have been completed from actions which are to be performed. At a predetermined time, the Task List server 110 may notify (remind) the user about the actions which are planned to be performed. Likewise, the Task List server 110 may automatically perform the actions at a predetermined time. Assume that the Task List server 110 has assisted the user to complete "MAKE FLIGHT RESERVATION" "MAKE CAR RESERVATION" "MAKE HOTEL RESERVATION" "GET an AREA MAP" and has generated "CONTACT LIST" for an action "CONTACT FRIENDS & FAMILIES," as shown with the action item window 640. The rest of the actions (to-do actions) which have not been yet performed may be highlighted, represented in a different color, or attached with a visual indicator. The to-do actions will be reminded or performed at a predetermined time.

As illustrated in FIG. 6D, information buttons 610-618 are presented for the user to review the detailed information related to the task list. The detailed information may be a result of completed actions. For example, the user selects SHOW FLIGHT RESERVATION 610 to review the flight reservation information. Further, the detailed information may be provided for the user to perform an action. For example, SHOW CONTACT LIST 616 provides the previously gathered contact information while the user was performing "CONTACT FRIENDS & FAMILIES" action. Alternatively, the user can select INFO 642-647 to obtain information associated with a particular action within the action list window 640. For example, the user can select INFO 642 for reviewing the flight reservation information or INFO 645 for obtaining the previously gathered contact information.

It will be appreciated that the aforementioned examples used in conjunction with exemplary screens 500, 600 are for illustrative purposes only, and thus, are not to be construed as limiting. It is contemplated that the user can update the task list anytime if the user desires. In response to the change, the Task List server 110 may need to execute new series of actions. The Task List server 110 may cancel or change the existing reservations. New actions may be added to the task list. For example, the user can change START DATE 606 of the trip. The Task List server 110 may identify a template (or human action-flow) corresponding to "UPDATE" and "AIR TRIP." The Task List server 110 works through the actions specified in the template and update reservations.

Figure 7A:
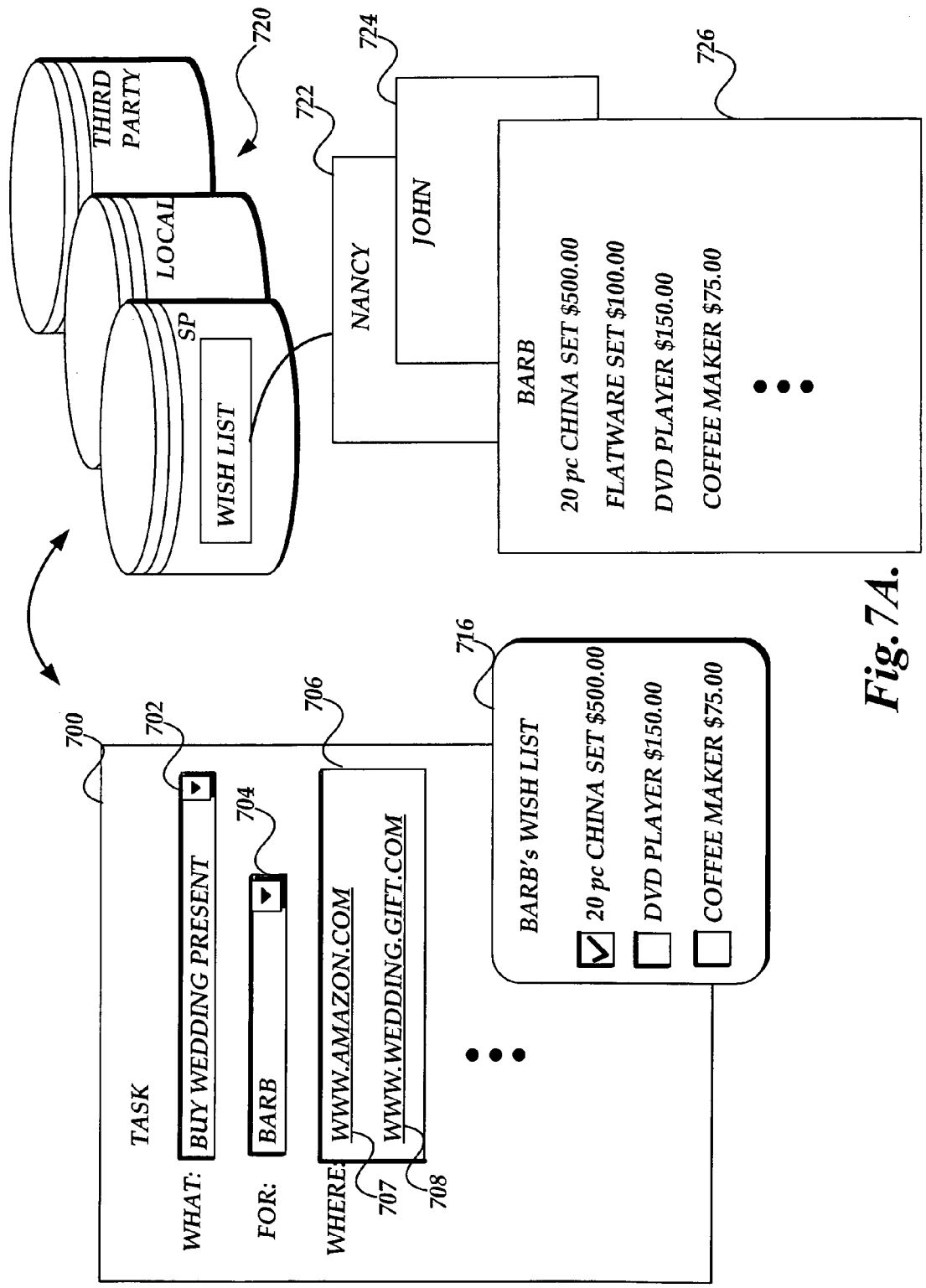
FIGS. 7A-7D are pictorial diagrams of other exemplary screen displays for suggesting a task to a group of users based on a sociable event in accordance with an aspect of the present invention.

Referring to FIGS. 7A-7D, pictorial diagrams of another exemplary screen 700 generated on a user device after a proactive action (e.g., an action relating to a sociable event, an action relating to a group of users, etc.) has been suggested are shown. As mentioned above, a proactive action can be suggested by an individual user or the Task List server to a group of relevant people. In particular, FIG. 7A illustrates an exemplary screen display 700 reflecting resultant queries after the Task List server 110 received the user input including a task description 702 "BUY WEDDING PRESENT" for "Barb" In one embodiment, the Task List server 110 allows the user to propose an action to a group of people who are relevant to the action. In another embodiment, the Task List server 110 may proactively propose (suggest) some actions to a group of people. In this example, the user wants to propose to a group of high school friends "BUY WEDDING PRESENT."

The Task List server 110 may further assist the user to propose an action to the group of people. For example, the Task List server 110 may obtain information about online stores where Barb specified her wish lists. Such information may be obtained from Barb's user profile database, or the like. In this example, assume that Barb has specified wish lists in various stores 707, 708, as depicted in the input box 706. As shown in FIG. 7A, when the user selects a store 707, the Task List server 110 may identify the wish list 726 corresponding to the selected store 707. The identified wish list may be displayed via a wish list window 716.

Figure 7B:
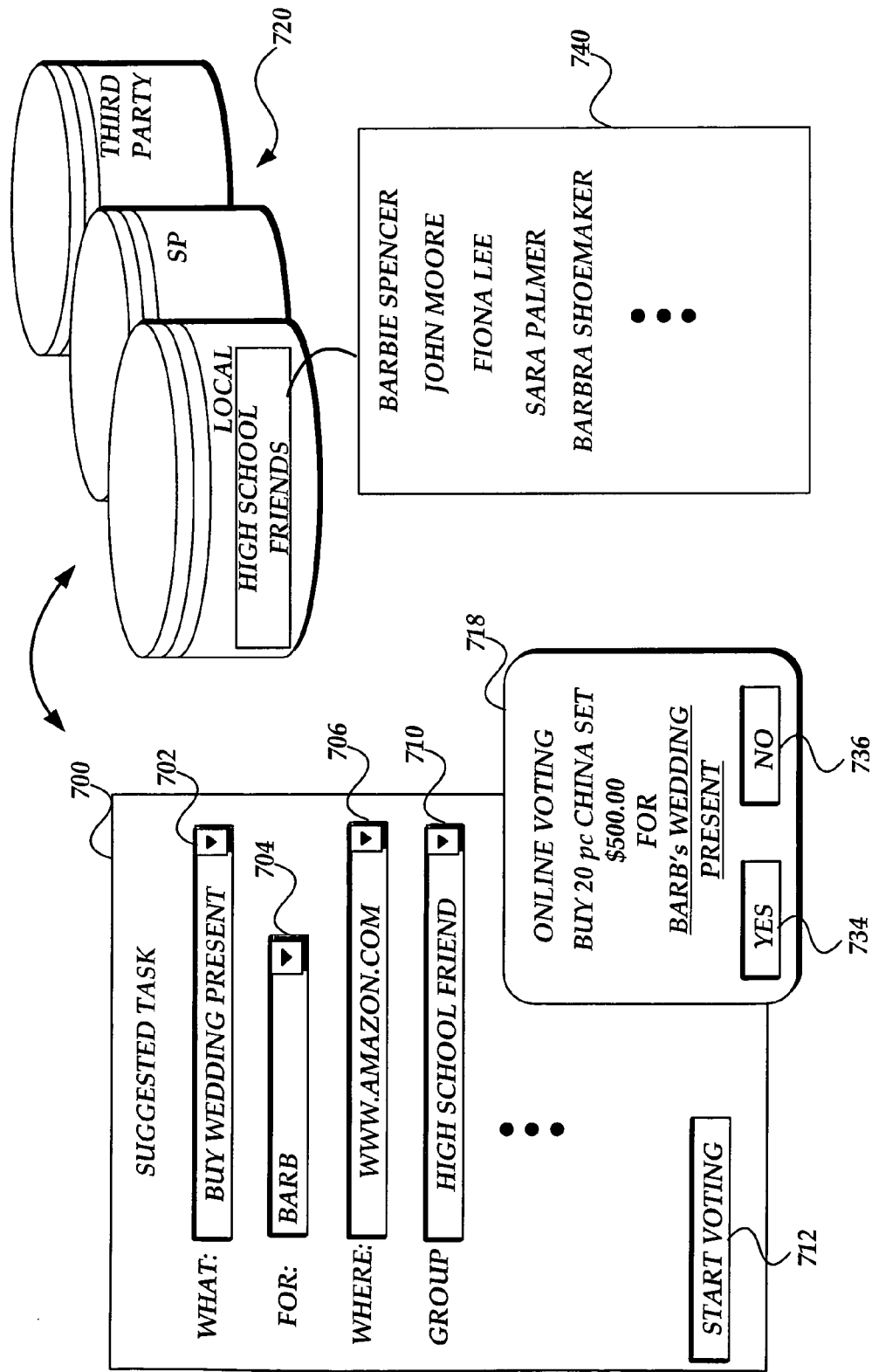
Figure 7C:
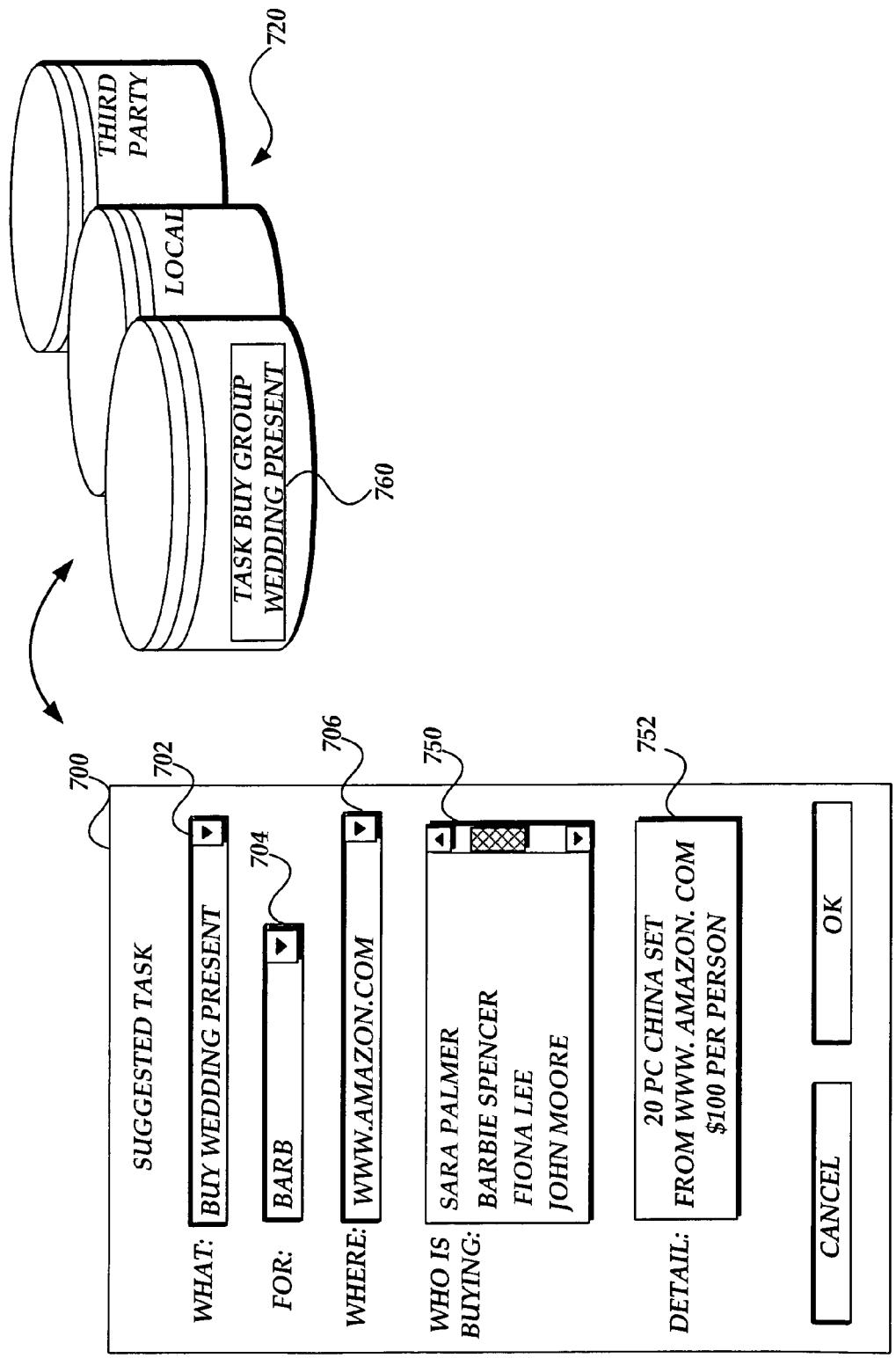

Within the wish list window 716, the user may select "20 piece China Set" for Barb's wedding gift. Assuming that the user wants to suggest a group of high school friends to purchase "20 piece China Set" for Barb's wedding gift. As shown in FIG. 7B, the user may request the Task List server 110 to start an online voting among the group of high school friends by pressing START VOTING 712. The Task List server 110 may display an online voting window 718 to the identified high school friends 740 who currently online. If some of the identified high school friends 740 are not currently online, an electronic message including the voting information may be transmitted to them. In an embodiment, the user can add or remove names from the identified high school friends 740 before the online voting starts. Likewise, any of the high school friends 740 can indicate in their user profile data specifying a rule to filter out a proactive action suggested by other users or the Task List server 110. FIG. 7C depicts the resultant display 700 after the Task List server 110 collects responses from the group of high school friends within a predefined period for the online voting. In this example, several people have accepted the suggested action. The Task List Server 100 may evaluate the suggested action and the responses. Assume that 5 friends voted "YES," the Task List server 110 may display the names of the voters who accepted the suggested action within a display box 750. Likewise, the Task List server 110 may also display the names of voters who rejected the suggested action. As shown in a display box 752, the detail information relating to the voting results, such as price information, store information, gift information, etc., may be displayed. After the proactive action has been proposed to the group of users, the Task List server 110 will start building a task list relating to the proactive action. In this example, the Task List server may build an appropriate task list to complete a task "BUY GROUP WEDDING PRESENT" 760 with relevant information obtained though FIGS. 7A-7C. Likewise, a task list including an action "CONTRIBUTE MONEY" may be generated for the high school friends who voted "YES."

Figure 7D:
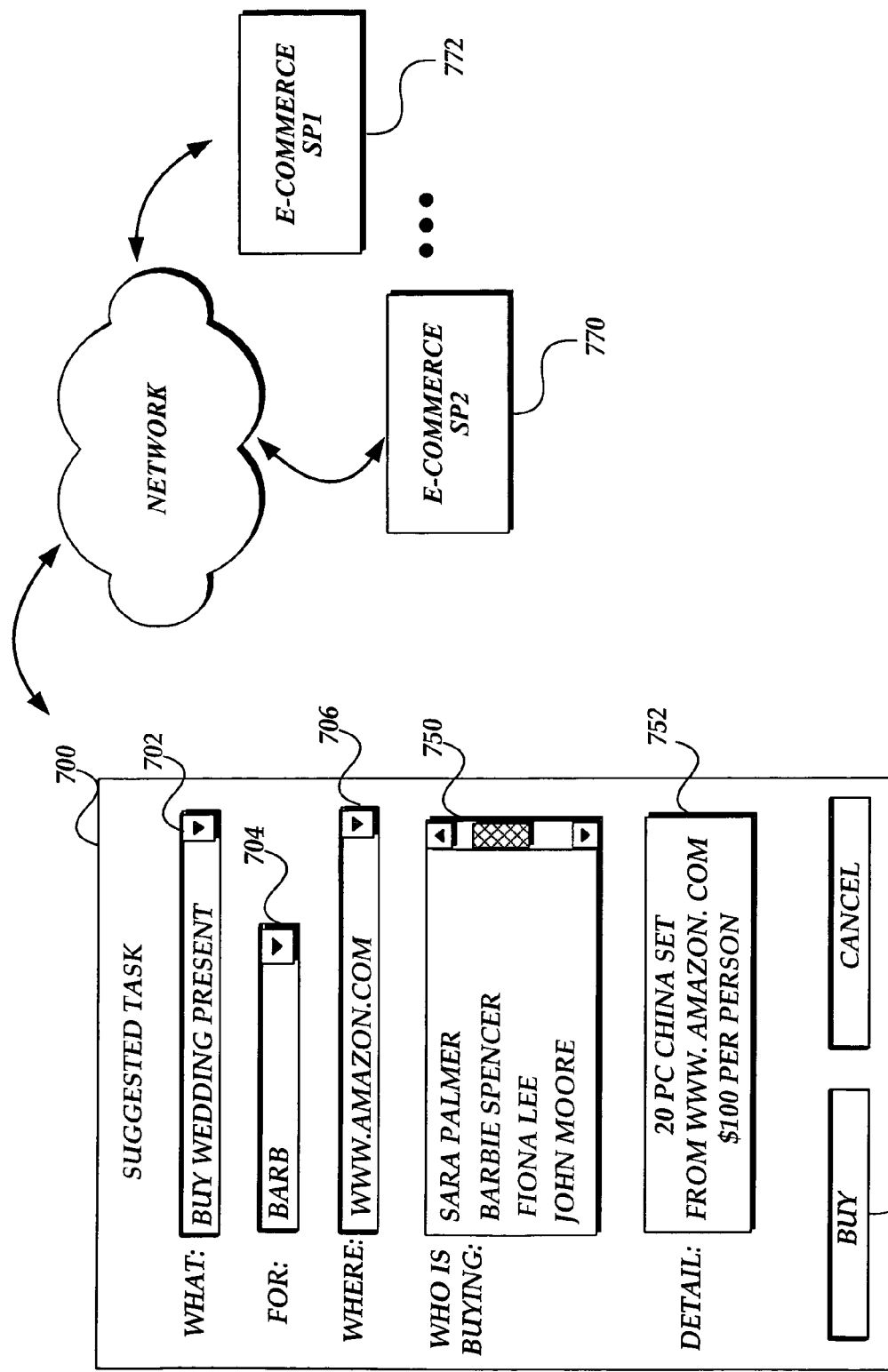

As shown in FIG. 7D, in an alternative embodiment, the user can complete the task "BUY GROUP WEDDING PRESENT" by selecting BUY 762 provided within the exemplary screen display 700. In this embodiment, all other actions relating to "BUY GROUP WEDDING PRESENT" may be executed in the background by the Task List server 110 in conjunction with several E-commerce Service Providers 770-772. After the task "BUY GROUP WEDDING PRESENT" is completed, a task list including an action "CONTRIBUTE MONEY" may be generated for high school friends who voted "YES" and the user will be reminded of the money to collect.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system including a processor for managing tasks, the system comprising:
   at least one database for storing information relating to user profile information and information relating to one or more predefined words, wherein the one or more predefined words correspond to a natural language; and
   at least one task management service in communication with the at least one database, the at least one task management service operative to:

receive user input that specifies a task description for a task, the task description including at least a string of characters;

parse the string of characters of the task description to identify an action word in the at least one database, the action word corresponding to at least one of the one or more predefined words stored in the at least one database;

identify, based in part on the identified action word, a plurality of templates, associated with the identified action word, stored in the at least one database, each template of the plurality of templates including a different plurality of actions;

receive, from the user, a selection of a first template from the plurality of templates;

generate a task list including the plurality of actions of the first template, two or more of the plurality of actions each including at least one sub-action that requires additional information from the user before the at least one sub-action is able to be executed;

obtain, from the user for each of the two or more actions, the additional information for the at least one sub-action;

execute the at least one sub-action for each of the two or more actions, wherein the at least one sub-action has been updated using the additional information obtained from the user; and determine that each action of the task list has been completed based at least in part on execution of the at least one sub-action for each of the two or more actions.

2. The system of claim 1, wherein the task management services store each of the plurality of actions of the plurality of templates as a subtask of the task in conjunction with the identified action word.

3. The system of claim 1, wherein the task management services execute at least one action of the task list at a predetermined time without intervention from the user.

4. The system of claim 3, wherein after executing the at least one action, the at least one task management service logs and stores a result of the execution of the at least one action.

5. The system of claim 1, wherein the task management services determine a series of actions based on the identified action word.

6. The system of claim 5, wherein the task management services schedule an execution order for the series of actions.

7. The system of claim 1, wherein the task management services present the at least one sub-action for each of the two or more actions to the user; and wherein the at least one sub-action for each of the two or more actions requires user interaction to be executed.

8. The system of claim 1, wherein the task management services search an online database over a network connection to enable the user to complete the task.

9. The system of claim 1, wherein the task management services obtain information from a map service server over a network connection.

10. The system of claim 1, wherein the task management services search a local database to enable the user to complete the task.

11. The system of claim 1, wherein at least one action of the task list includes purchasing an item via a network based service provider.

12. The system of claim 1, wherein at least one action includes a recurrent sub-action that has been previously executed.

13. The system of claim 1, wherein the additional information is also received from a network based service provider.

14. The system of claim 1, wherein the additional information is also received from an online database.

15. A computer-implemented method for scheduling tasks based on user input, the method comprising each of the following as executed on at least one computing device:

receiving the user input indicating a task description, the task description including at least a string of characters;

parsing the string of characters of the task description into action words, wherein the action words are stored in a natural language database;

upon identifying each action word, creating a detailed task plan by identifying a plurality of templates associated with the identified action word and, stored in a template database based on the action word, each template of the plurality of templates including a different plurality of actions;

receiving, from the user, a selection of a first template from the plurality of templates, the first template including a first plurality of actions;

generating a task list including the first plurality of actions, two or more of the first plurality of actions each including at least one sub-action requiring additional information from the user before the sub-action is able to be executed;

obtaining, from the user for each of the two or more actions, the additional information for the at least one sub-action;

executing the at least one sub-action for each of the two or more actions, wherein the at least one sub-action has been updated using the additional information; and determining that each action of the task list has been completed based at least in part on executing the at least one sub-action for each of the two or more actions.

16. The computer-implemented method of claim 15, further comprising:
if at least one action of the task list needs an immediate execution, executing the at least one action with the obtained additional information.

17. The computer-implemented method of claim 15, further comprising:
if at least one action of the task list does not need an immediate execution, determining time/date information about when the at least one action is to be executed; and
storing the at least one action with the time/date information and the obtained additional information.

18. The computer-implemented method of claim 17, further comprising:
based on the time/date information, alerting the user about at least one action to be executed.

19. The computer-implemented method of claim 18, wherein the user is alerted via an audible indicator.

20. The computer-implemented method of claim 18, wherein the user is alerted via a visual indicator.

21. The computer-implemented method of claim 18, wherein the user is alerted via an electronic message.

22. The computer-implemented method of claim 15, wherein obtaining additional information includes querying the additional information from a third-party service provider.

23. The computer-implemented method of claim 22, wherein the third-party service provider is a search service provider.

24. The computer-implemented method of claim 22, wherein the third-party service provider is a map service provider.

25. The computer-implemented method of claim 22, wherein the third-party service provider is an e-commerce service provider.

26. The computer-implemented method of claim 22, wherein the third-party service provider is a call center.

27. The computer-implemented method of claim 15, wherein obtaining additional information includes querying the additional information from personalized user data, which includes previously executed actions, sub-actions, and conditions.

28. A non-transitory computer-readable storage medium including instructions for assisting a user to plan a task, the instructions when executed by at least one processor causing the at least one processor to:
 receive a task description from the user, the task description including at least a string of characters;
 identify an action word from the string of characters of the task description and generate a task list based on the identified action word and a plurality of templates associated with the action word, each template of the plurality of templates including a different plurality of actions, the identified action word is stored in a natural language database, and the task list stored in a task list database, the task list specifying a plurality of actions;
 receive, from the user, a selection of a first template from the plurality of templates, the first template including a first plurality of actions, two or more of the first plurality of actions including at least one sub-action that requires additional information before the at least one sub-action is able to be executed;
 obtain, from the user for each of the two or more actions, the additional information for the at least one sub-action;
 execute the at least one sub-action for each of the two or more actions, the at least one sub-action being modified in accordance with the additional information obtained from the user; and
 determine that each action of the task list has been completed based at least in part on execution of the at least one sub-action for each of the two or more actions.

29. The non-transitory computer-readable storage medium of claim 28, wherein the instructions when executed further cause the at least one processor to:
 store an action specified in the task list, the action being determined to be executed at a predetermined time.

30. The non-transitory computer-readable storage medium of claim 28, wherein the instructions when executed further cause the at least one processor to:
 display the generated task list; and
 enable the user to modify the generated task list.

31. The non-transitory computer-readable storage medium of claim 30, wherein the instructions when executed further cause the at least one processor to:
 identify an action which needs to be re-executed according to a user modification;
 obtain information relating to the identified action; and
 execute the identified action with the obtained information relating to the identified action.

32. The non-transitory computer-readable storage medium of claim 30, wherein the instructions when executed further cause the at least one processor to:
 identify an action which needs to be removed from the task list based on a user modification; and
 remove the identified action and relevant information from the task list.

33. The non-transitory computer-readable storage medium of claim 30, wherein the instructions when executed further cause the at least one processor to:
 identify a new action which needs to be added to the task list based on a user modification; and
 add the new action into the task list.

34. A device for enabling a user to complete a task, comprising:
 at least one processor;
 memory including instructions executable by the at least one processor to provide:
 an action component to identify one or more actions in a task database by utilizing action words that are stored in a natural language database which correspond to a task description input by a user, at least one action word being associated with a plurality of templates, each template of the plurality of templates including a different plurality of actions, the task description including at least a string of characters, the action component further configured for selecting a first template from the plurality of templates, the first template including a first action from the plurality of actions based at least in part on information stored in the task database, wherein the first action includes a first sub-action that requires additional information from the user before the first sub-action is able to be executed;
 an additional information component to obtain additional information from the user relating to the first sub-action, the information being obtained from the user while and/or after the at least one sub-action is being determined;
 an updating component to update the first sub-action using the additional information obtained from the user; and
 a result information component to display a result which is produced from an execution of the first sub-action with the additional information obtained from the user, the result which is produced from an execution of the first sub-action.

35. The device of claim 34, further comprising a reminder component, to alert the user of the first action at a predetermined time, the reminder component being associated with the first action.

36. The device of claim 34, wherein the action component schedules execution of the first action at a predetermined time.

37. The device of claim 34, wherein the additional information component obtains the information from a local database.

38. The device of claim 34, wherein the first action includes a plurality of sub-actions, each sub-action requiring a separate execution.

39. The device of claim 34, wherein the first action is stored for execution at a predetermined time.

40. The device of claim 34, further comprising an action suggesting component configured to propose a task to a group of users and to receive from the group of users a response with respect to the proposed task.

41. The device of claim 40, wherein the action suggesting component provides an online voting to receive the response from the group of users.

42. The device of claim 41, wherein the action suggesting component provides an electronic message to receive the response from the group of users.

43. The device of claim 40, wherein the action suggesting component identifies the proposed task when a sociable event is detected among the group of users.

44. The device of claim 34, wherein the action suggesting component enables the user to propose a task to other users.

\* \* \* \* \*